US010353099B2

(12) United States Patent
Sassen

(10) Patent No.: US 10,353,099 B2
(45) Date of Patent: Jul. 16, 2019

(54) METHODS AND SYSTEMS FOR SEISMIC INVERSION AND RELATED SEISMIC DATA PROCESSING

(71) Applicant: ION Geophysical Corporation, Houston, TX (US)

(72) Inventor: Douglas Spencer Sassen, Richmond, TX (US)

(73) Assignee: ION Geophysical Corporation, Houston, TX (US)

(*) Notice: Subject to any disclaimer, the term of this patent is extended or adjusted under 35 U.S.C. 154(b) by 210 days.

(21) Appl. No.: 14/922,704

(22) Filed: Oct. 26, 2015

(65) Prior Publication Data

US 2016/0116620 A1 Apr. 28, 2016

Related U.S. Application Data

(60) Provisional application No. 62/068,481, filed on Oct. 24, 2014.

(51) Int. Cl.
| | |
|---|---|
| *G01V 1/36* | (2006.01) |
| *G01V 1/28* | (2006.01) |
| *G06F 17/50* | (2006.01) |

(52) U.S. Cl.
CPC ............ *G01V 1/368* (2013.01); *G01V 1/282* (2013.01); *G01V 2210/23* (2013.01); *G01V 2210/614* (2013.01); *G01V 2210/67* (2013.01)

(58) Field of Classification Search
CPC .... G01V 1/368; G01V 1/282; G01V 2210/67; G01V 2210/614; G01V 2210/23
See application file for complete search history.

(56) References Cited

U.S. PATENT DOCUMENTS

| 6,188,964 B1* | 2/2001 | Reister .................. G01V 1/362 |
| | | 702/17 |
| 2011/0307438 A1 | 12/2011 | Martinez |
| 2012/0020186 A1* | 1/2012 | Luo ......................... G01V 1/28 |
| | | 367/21 |

FOREIGN PATENT DOCUMENTS

WO 2014144168 A2 9/2014

OTHER PUBLICATIONS

Berkhout, A. J., "The Seismic Method in the Search for Oil and Gas: Current Techniques and Future Developments," 8078 Proceedings of the IEEE., 74 (1986) Aug., No. 8, XP-001344974, New York, USA.

(Continued)

*Primary Examiner* — Brian Turner
(74) *Attorney, Agent, or Firm* — Holland & Hart LLP

(57) ABSTRACT

A method and system of processing seismic data is presented. The method may include, for each of a plurality of seismic traces, generating a respective intermediate set of reflectivity coefficients and a partial deconvolution of an estimated wavelet from the respective seismic trace. The method may also include decomposing a model into a plurality of orthogonal components, and projecting each of a plurality of eigenvectors corresponding to one of the orthogonal components onto intermediate reflectivity coefficients corresponding with all of the plurality of seismic traces at each of a plurality of times to generate a plurality of eigen-coefficients associated with each of the plurality of times. The eigen-coefficients may be used to generate a plurality of basis coefficients, which may then be used to generate a respective updated set of reflectivity coefficients for each of the seismic traces.

15 Claims, 18 Drawing Sheets

(56) References Cited

OTHER PUBLICATIONS

International Search Report for International Appl. No. PCT/US2015/057358 dated Feb. 25, 2016, from European Patent Office.

* cited by examiner

METHODS AND SYSTEMS FOR SEISMIC INVERSION AND RELATED SEISMIC DATA PROCESSING

CROSS REFERENCES

This application claims priority to and the benefit of U.S. Provisional Patent Application No. 62/068,481, titled "Methods and Systems for Seismic Inversion and Related Seismic Data Processing," filed Oct. 24, 2014, which is hereby incorporated by reference in its entirety for all purposes.

TECHNICAL FIELD

The present disclosure generally relates to seismic data processing, and more particularly to compressed seismic inversion techniques.

BACKGROUND

Seismic imaging may be performed by activating a seismic energy source and by directing seismic energy into a portion of the ground. The seismic energy travels through the ground, though some of the seismic energy may be reflected back to the ground's surface (or in other directions) as the seismic energy encounters interfaces within the ground. The reflected seismic energy may be recorded using seismic energy receivers. The recorded data may then be processed in order to generate a seismic image of the portion of ground to which the seismic energy was directed. However, seismic imaging may result in large amounts of data requiring processing. The processing of large amounts of seismic data can be expensive in both time and resources.

Recent attention to the problem of "big data," where massive amounts of data is analyzed and understood, has led to a variety of methods from applied mathematics for reducing data to its most salient description. Methods used to find a representation of large data sets with a limited number of non-zero model parameters, or coefficients, include the broad categories of compressed-sensing and sparse approximation. In these methods, an optimization algorithm may be used in conjunction with an "L1" penalty to find a minimal number of model parameters needed to describe the data. This type of optimization can be thought of as an algorithmic representation of Occam's razor, or parsimony, where the simplest model is sought over an excessively complex model. The inverse modeling and processing of seismic data are strong candidates for these sparse optimization techniques, because of the massive level of redundancy within gathers and neighboring gathers.

DETAILED DESCRIPTION

Compressed Seismic Inversion

Figure 1A:
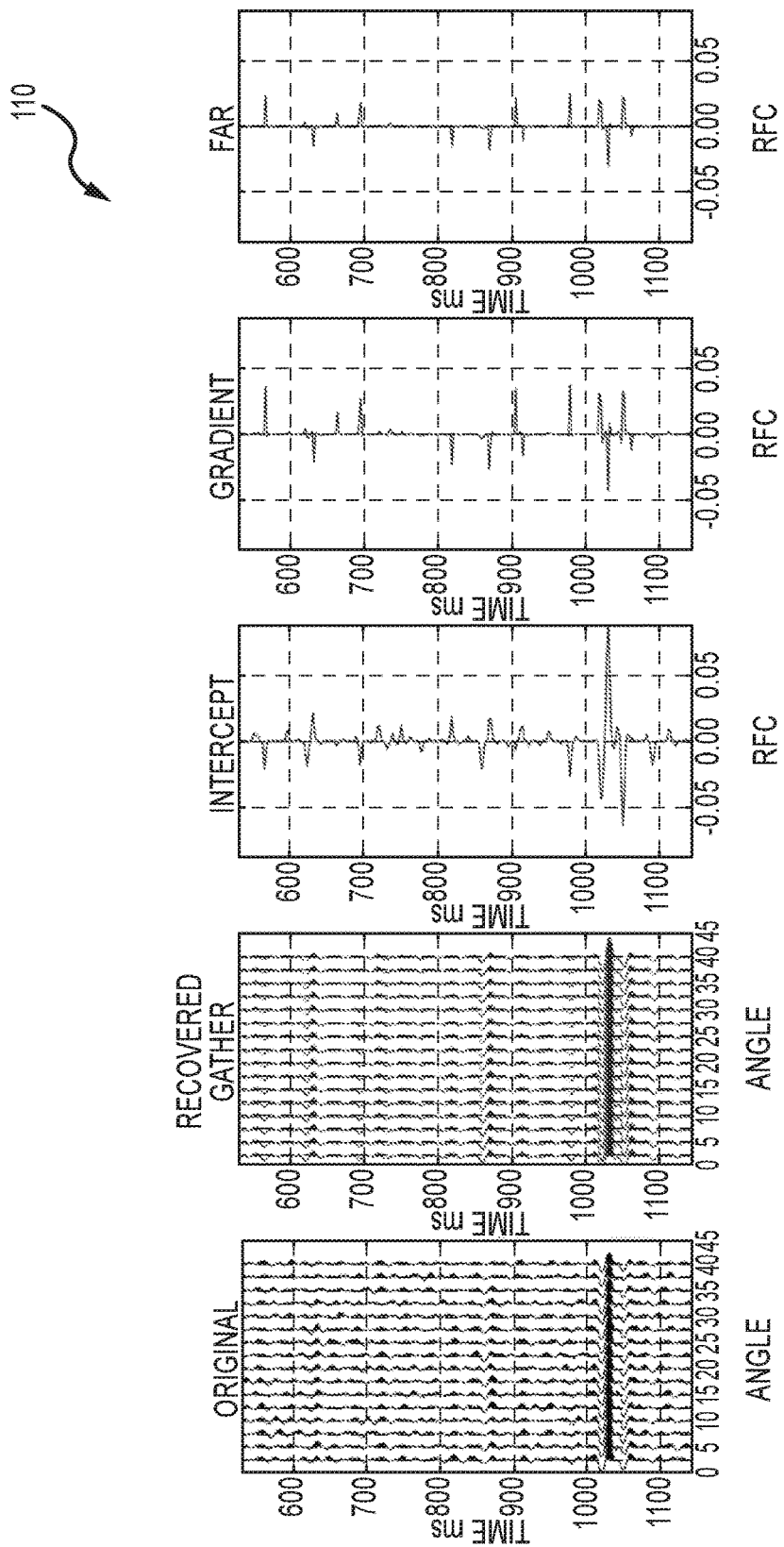
FIGS. 1A-1C illustrate compressed seismic inversion (CSI) and reconstruction data for different noise levels in accordance with aspects of the present disclosure.

Compressed-Seismic Inversion (CSI), as described herein, is a novel inversion technique that may be applied to post-stack and pre-stack seismic data for both amplitude variation with offset (AVO) and amplitude variation with angle (AVA), as well as AVO with azimuthal anisotropy (AVOz) and AVA with azimuthal anisotropy (AVAz). In what follows, the CSI algorithm is presented and its development for the cases of post-stack and pre-stack AVO and pre-stack AVAz is discussed. Additional discussion is also included regarding CSI extensions to wideband inversion, and the advantages of CSI over alternative options.

In short, some of the advantages of CSI include convergence with computational efficiency. As explained below, CSI includes only one "knob" for calibration. CSI may be used to reconstruct large amounts of migrated seismic data with a small number of non-zero coefficients, representing a compression of denoised seismic data. By analyzing the non-zero coefficients of CSI, one can determine the amount of independent information that is resolvable from the analyzed seismic data. CSI explicitly accounts for wavelet and known distortions. CSI may be used to provide rock physics properties (at least when the rock physics relationships are able to be linearized). As explained in greater detail below, the AVOz version may be setup for an arbitrary level of anisotropy Iterative Hard Thresholding (IHT), orthorhombic, monoclinic, etc. In the AVOz case, the AVOz may be set up to be rotationally invariant (meaning that the axis of symmetry need not be solved for). Further, the AVOz version may report the resolved anisotropy parameters (such as axis symmetry, p-impedance, s-impedance, $\varepsilon_1$, $\varepsilon_2$, $\varepsilon_3$, $\delta_1$, $\delta_2$, and $\gamma$), as identified below.

The seismic model used in CSI may assume a weak interaction between reflectors. This means that a simple expression of seismic data and reflectivity may be used via a convolutional model expressed as:

$$S(t)=W(t)*R(t)+n(t), \quad (1)$$

where $S(t)$ is the seismic signal, $W(t)$ is the seismic wavelet, $R(t)$ is the reflectivity series and $n(t)$ is the noise. The inverse problem is to recover $R(t)$ from the seismic data and source wavelet by searching for models of $R(t)$ that minimize the norm of the observed seismic data and the proposed synthetic seismic data. For an inconsistent set of linear equations, which arise when a system is noisy or the wavelet is not well determined, regularization is usually needed to find a stable solution to the inversion. In the typical L2 norm case, the minimization function becomes:

$$f=|W(t)*R(t)-S(t)|^2+\lambda|R|^2, \quad (2)$$

where $\lambda$ is the weighting term for the regularization. In a Bayesian sense, the L2 regularization term implies a Gaussian model covariance, and is equivalent to a prior smoothing constraint that essentially removes any sharp discontinuities from the resulting inversion as $\lambda$ increases to allow convergence to norm. This infinitely smooth model of the Earth is inconsistent with outcrop observations of the abrupt discontinuities in lithology marking formation boundaries. It's also inconsistent with the observation from well logs that reflectivity can be approximated with a double sided exponential distribution. An alternate regularization to the problem that doesn't result in a smoothed representation of the system is to use a L1 norm regularization term. The L1 norm regularization implies a double sided exponential model covariance, and promotes a sparse and sharp representation of the solution:

$$f = |W(t)*R(t) - S(t)|^2 + \lambda |R|^1. \qquad (3)$$

This function (equation 3) is a mixed norm, with L2 on the model discrepancy and a L1 on the regularization, that implies a Gaussian error model (L2), while the L1 enforces that the model of reflectivity has a sparse-spike representation.

Some embodiments of the present disclosure may utilize an iterative soft thresholding algorithm (ISTA) for solving linear inverse problems with a sparsity constraint. While solving a set of linear equations that are naturally diagonal in an orthonormal basis with L1 regularization is relatively straight forward (e.g. thresholded SVD), the more general inversion problem with a L1 regularization (equation 3), such as sparse-spike deconvolution, is actually a set of coupled non-linear equations, for which convergence to norm is not guaranteed. This problem may be bypassed by using surrogate functionals (g) that simplify the problem. These surrogates may be minimized via an iterative convex optimization method with proven convergence to norm.

In one version of the optimization method or algorithm, the following two steps are repeated until convergence occurs.

Step 1. $g_t = R_t + \mu W(\omega)*(W(\omega)*R_t(\omega) - S(\omega))$, (Fourier Domain), where $\mu = 1/\max(|W(\omega))|^2)$.

$$f(g(t)) = \begin{cases} g(t) - T & \text{if } g(t) > T \\ g(t) + T & \text{if } g(t) < T, \\ 0 & \text{if } |g(t)| < T \end{cases} \text{ where } T = \lambda\mu/2 \text{ (Time Domain)}.$$

Step 2.

This technique uses a soft thresholding rule F(g) to eliminate wavelet coefficients (i.e. spikes) that fall below noise levels while iterating towards a sparse set of coefficients that fit observed seismic data. The end result may be a model that has preserved reflections resolvable by the bandwidth of the seismic above noise and without smoothing.

This method, however, may find primary application to single 'stacked' seismic data traces. Solutions to multiple stacks, or a gather, may use a stack constructed from the sum of linearly independent stacks to provide a codependence between all of the stacks. With the sum stack, a non-linear correlation model may be used that imposes a soft constraint that the spikes are positioned at the same locations for every stack related to all of the reflectivity series. The requirement of linear independence of the stacks lead to singular value decomposition (SVD) to ensure that stacks are in fact independent. This concept can be extended, as described herein, to a method for handling pre-stack seismic data.

Pre-Stack Compressed Seismic Inversion

Some embodiments of the present disclosure couple a soft thresholding technique with thresholding SVD.

The Zeoppritz equations used in AVO inversion can be written in linear form. For example the reflectivity for isotropic PP reflectivity:

$$R_{pp}^{iso}(\theta) = \frac{1}{2}\left(\frac{\Delta\rho}{\rho} + \frac{\Delta vp}{vp}\right) + \left(-2\frac{vs^2}{vp^2}\frac{\Delta\rho}{\rho} + \frac{1}{2}\frac{\Delta vp}{vp} - 4\frac{vs^2}{vp^2}\frac{\Delta vs}{vs}\right)\sin^2\theta + \frac{1}{2}\frac{\Delta vp}{vp}\sin^2\theta\tan^2\theta.$$

These AVO equations can be written in matrix form:

$$R = M_\theta M_A \begin{pmatrix} \frac{\Delta vp}{vp} \\ \frac{\Delta vs}{vs} \\ \frac{\Delta\rho}{\rho} \end{pmatrix} \text{ or } R = M_\theta \begin{pmatrix} \text{Intercept} \\ \text{Gradient} \\ \text{Far} \end{pmatrix},$$

where R is a vector of length N (the number of samples in a seismic gather for a particular time sample), $M_\theta$ is the basis function matrix for the seismic gathers, and $M_A$ is the a coefficient matrix relating the coefficients of the gather basis functions to the isotropic elastic parameters. It should be noted that these equations as traditionally expressed are not orthonormal and for typical seismic angles may be strongly correlated.

The unknown values of x (the elastic properties, linearized rock physics properties, etc.) may be calculated (or estimated) by first finding the inverse (or pseudoinverse) of M:

$$(M_\theta M_A)^{-1} R = x.$$

Least-squares may be used to find a solution to inconsistent linear equations (e.g. noisy systems) of m equations and n unknowns—with the requirement that its columns of M are independent and the rank is equal to n. If the system is rank deficient or if the columns are not independent, then the problem may have no solution or may be indeterminate (having infinite solutions). This issue arises in seismic inversion when one tries to estimate the $3^{rd}$ Tar' component of the Zeoppritz' Rpp equation at typical offsets. Usually this $3^{rd}$ component is below noise and is largely degenerate with the $2^{nd}$ component at angles less than 40 degrees. The method of Singular Value Decomposition (SVD) can be used to find the optimal solution to such problems.

A soft-threshold SVD inversion algorithm for these problems may be equivalent to regularization with a L1 norm that enforces a parsimonious model. SVD utilizes the calculation of eigenvalues and eigenvectors to both orthogonalize the system of equations and to find zero valued or nearly zero singular values (singular values=square root of eigenvalues). Any n by m matrix G can be factored into:

$$M_\theta M_A = G = U\Sigma V^T$$

where U is an m by m matrix consisting of columns populated with the eigenvectors of $GG^T$, and V is a n by n matrix consisting of columns populated with the eigenvectors of $G^T G$. The matrix $\Sigma$ is a diagonal matrix of the square roots of the eigenvalues for both $GG^T$ and $G^T G$. In this decomposition the pseudoinverse of G is given by:

$$G^{-1} = V\Sigma^{-1} U^T.$$

The truncation of zero or nearly zero singular values from the problem may allow one to optimally calculate the remaining system of equations. From another perspective, one is improving the condition number—which may be calculated as the ratio between the largest and smallest eigenvalue—of the matrix without introducing Tikhonov regularization and its side effects.

Traditionally, the truncation of the smallest singular values may be done by cutting all those that fall below a predetermined threshold. There is no explicit connection to the data. An alternative soft-thresholding approach may directly consider the data g(t) by first projecting the eigenvector onto the data prior to thresholding.

$$f = \sum \frac{1}{\sigma^2} F(\sigma(g(t) | u_k)) v_k$$

$$F(x) = \begin{cases} x - T & \text{if } x > T \\ x + T & \text{if } x < T, \\ 0 & \text{if } |x| < T \end{cases} \quad \text{where } T = \lambda\mu/2.$$

This method may preserve otherwise truncated terms when the rock properties are such that a strong response from small singular components occurs. This may capture both the ability to orthogonalize our known reflectivity equations, while honoring the variability of the data. In essence this procedure is a model selection method. The soft-thresholding SVD approach may be consistent with the assertion that the solutions should be sparse on a predefined orthonormal basis. Because the offset/angle domain is orthonormal to the time axis in our problem and the 'stacks' formed by the SVD are orthonormal, we may insert the pre-stack SVD inversion into the original algorithm.

Therefore, the original algorithm presented above may be modified to include steps 1, 2, and 3, which may be repeated until convergence.

Step 1. $g_i = R_i + \mu W(\omega)^* (W(\omega)^* R_i(\omega) - S(\omega))$, (Fourier Domain).

Step 2. $G = U\Sigma V^T$, $\sigma = \text{diag}(\Sigma)$ (AVA basis to SVD basis).

Step 3.

$$f = \sum \frac{1}{\sigma^2} F(\sigma(g(t) | u_k)) v_k \text{ (SVD/Time Domain - for all angles)},$$

where $$F(x) = \begin{cases} x - T & \text{if } x > T \\ x + T & \text{if } x < T, \\ 0 & \text{if } |x| < T \end{cases} \quad \text{where } T = \lambda\mu/2.$$

Figure 1B:
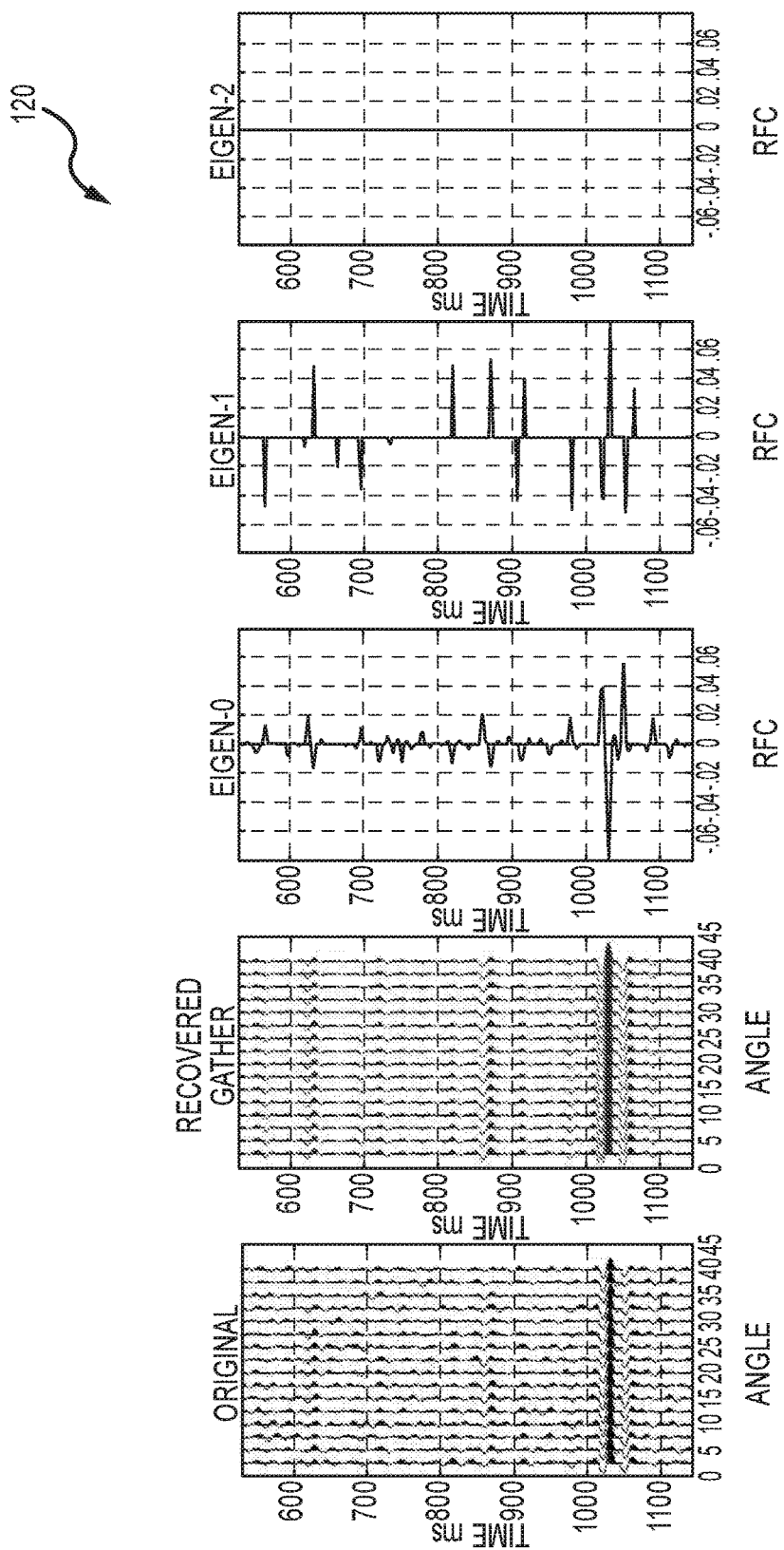
Figure 1C:
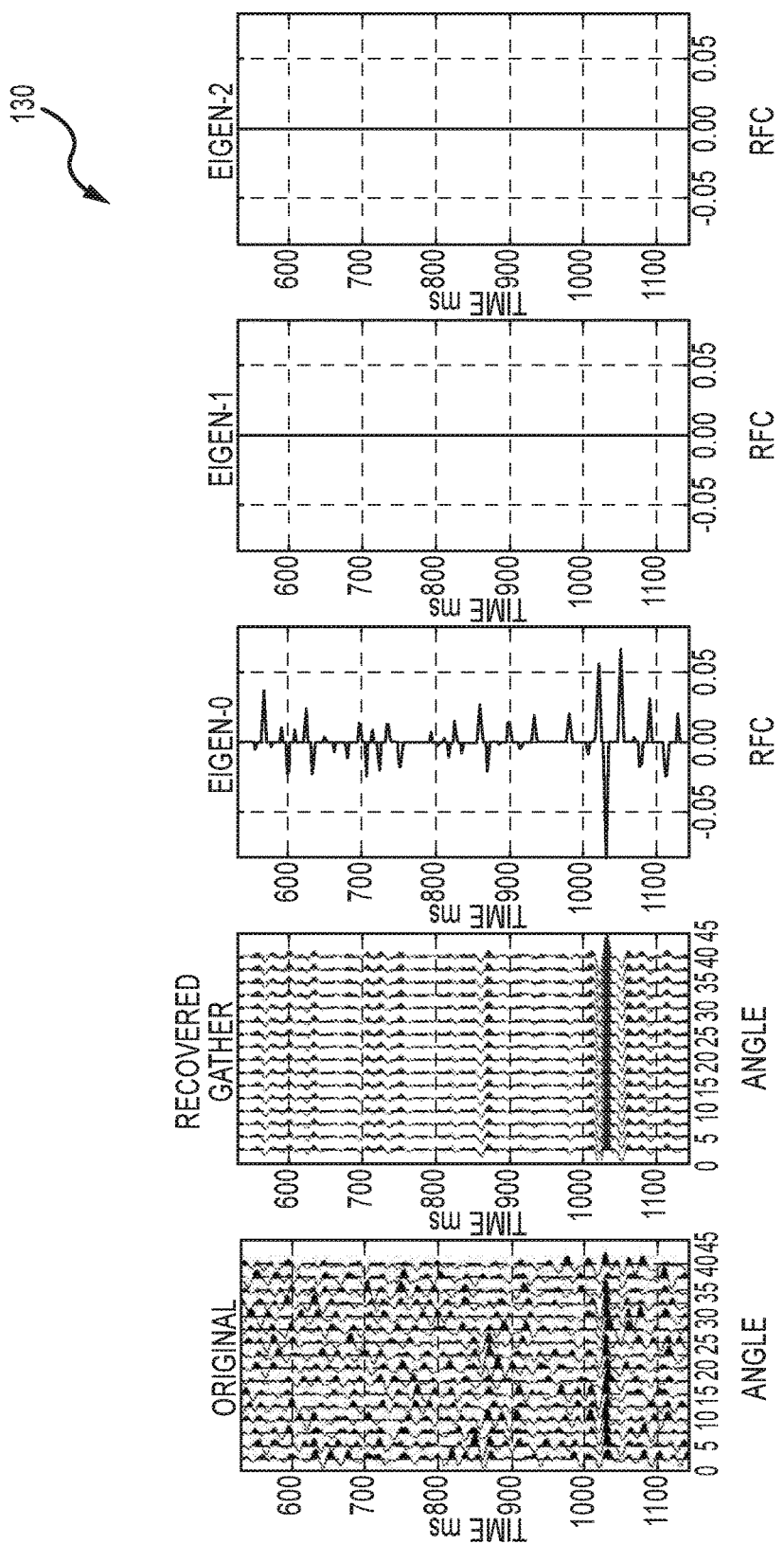

This addition may open the door for dealing with AVO/AVOz with much more complicated basis functions (e.g. orthorhombic anisotropy and joint PP/PS AVO). This may also allow the viewing of the amount of independent information (eigenvalues/vectors) that can be used to discriminate rock properties or geologic facies. An example of this inversion for synthetic pre-stack PP AVA data is shown in FIGS. 1A, 1B, and 1C with various levels of noise. Also note that because of the independence, differing thresholds may be used on each basis. Different wavelets may be used to account for linear distortions or wavelet stretch.

FIGS. 1A, 1B, and 1C illustrate CSI inversion and reconstruction data for different noise levels. Data 110 represents CSI inversion for synthetic data generated from Marcellus well logs with a noise level of σ=0.01 rfc. The coefficients on the right (e.g., intercept, gradient, far) were used to reconstruct the denoised gathers. Data 120 represents CSI results for the same data and noise level, but showing the eigenvalues. Data 130 represents CSI inversion and reconstruction for a noise level of σ=0.033 rfc.

Resolving the Underestimation of the 'Gradient' Component of AVA Inversion when Using FISTA and ISTA.

Figure 2A:
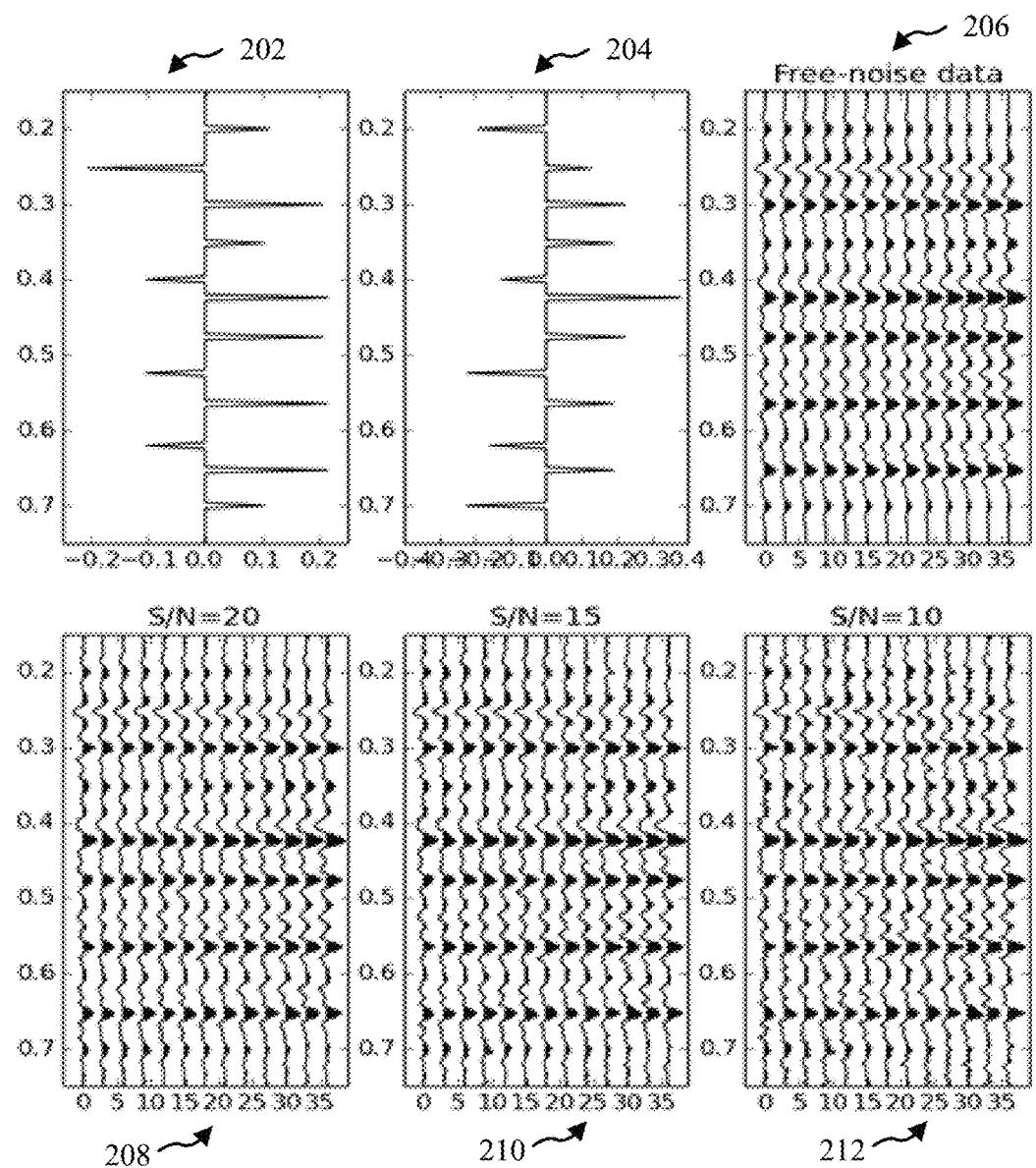
FIGS. 2A-2D illustrate comparisons of various CSI and fast iterative soft thresholding algorithm (FISTA) results in accordance with aspects of the present disclosure.
Figure 2B:
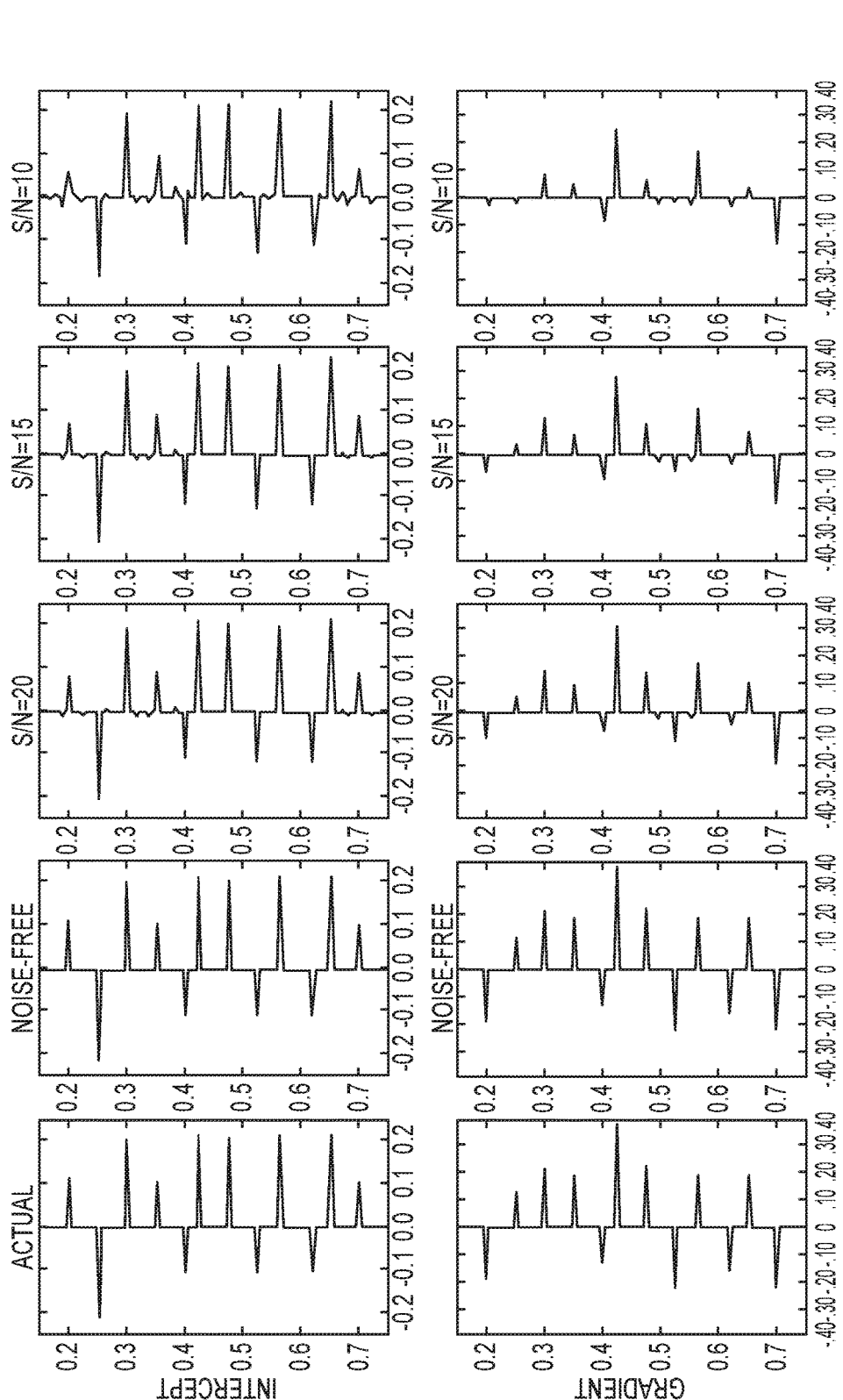

Other, non-CSI inversion algorithms may underestimate the gradient component. For example, underestimation of the gradient component may be made when using FISTA. FISTA (fast iterative soft thresholding algorithm) is a method that is related to the disclosed CSI inversion, though the FISTA method uses ISTA. The CSI inversion described herein may be compared with the FISTA method. By reproducing the inputs used in a FISTA test, the effectiveness of the CSI algorithm for the same problem may be compared. Therefore, FIG. 2A illustrates the results of a FISTA method with given inputs, while FIG. 2B illustrates the results 220 of the above-described CSI algorithm using the same inputs. In FIG. 2A, the actual intercept 202 and actual gradient 204 are used to generate the noise-free synthetic data 206 and the noisy data with S/N=20 (block 208), S/N=15 (block 210), and S/N=10 (block 212). The Ricker wavelet with 30 Hz center frequency and identical definition of S/N was used—variations are due to inexact coefficient estimates and differing random noise seed numbers. FIG. 2B illustrates that the above-described CSI algorithm may also result in the gradient component being underestimated as noise levels increase.

Figure 2C:
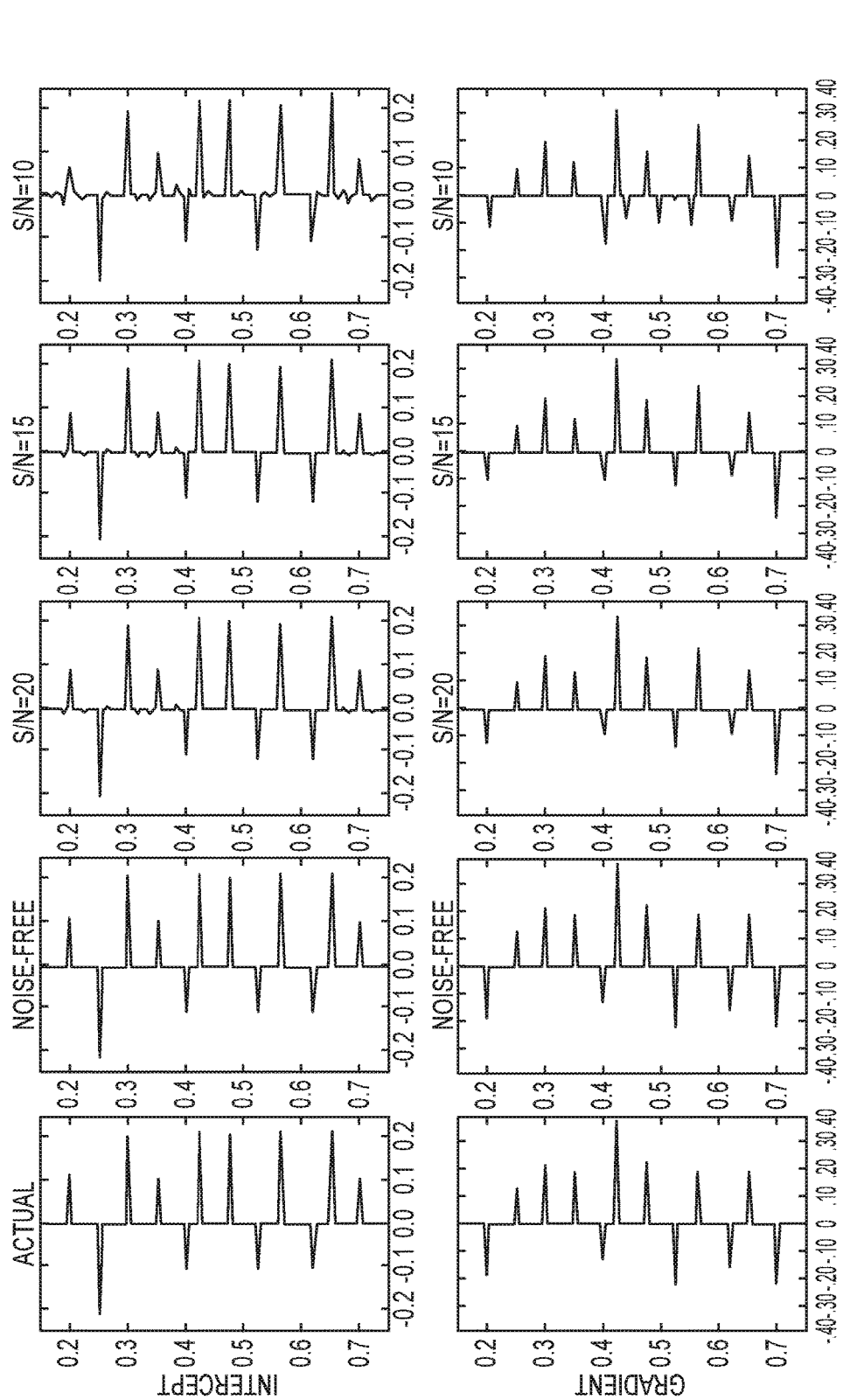
Figure 2D:
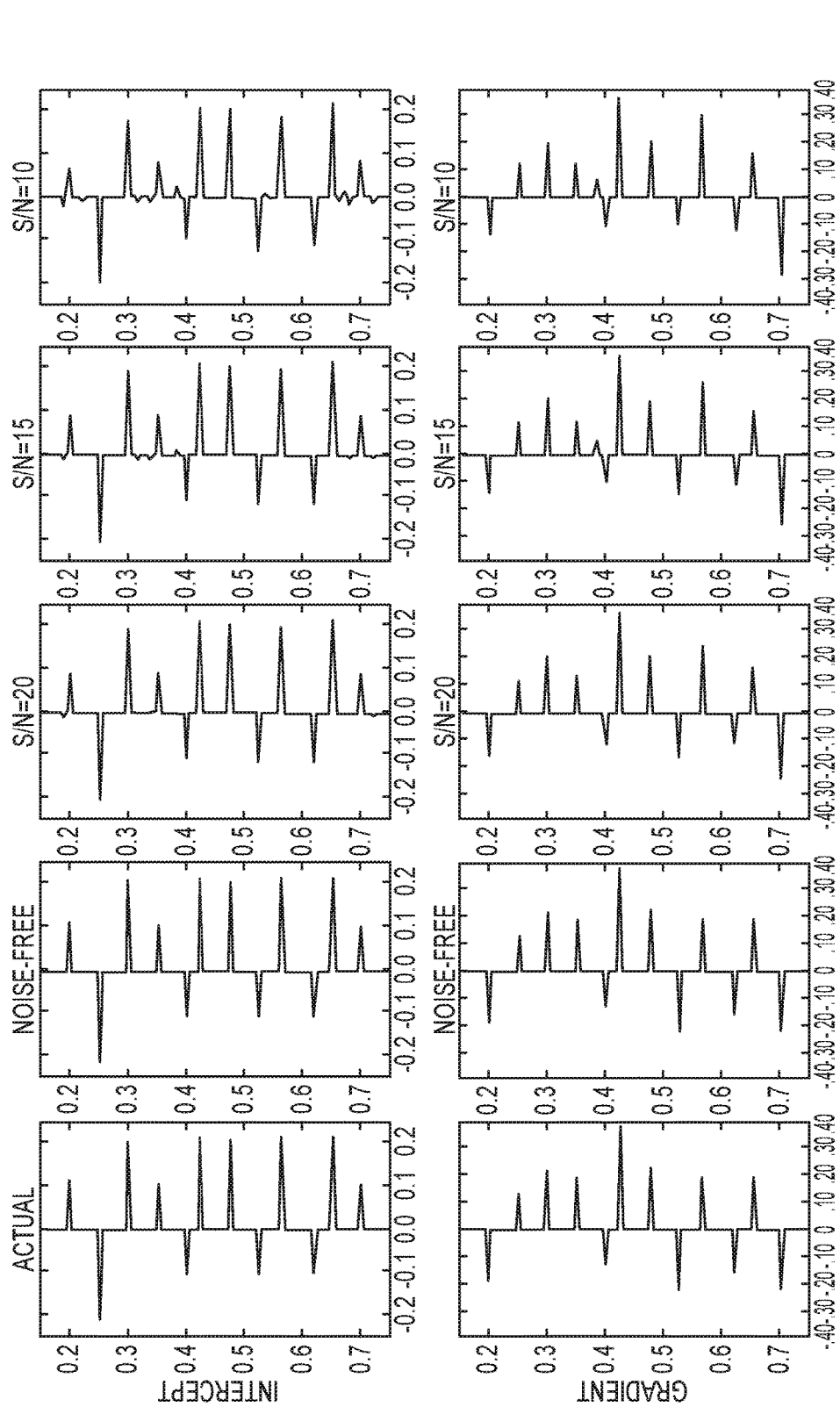

Instead of using a hybrid (F)ISTA/least-squares method, however, the following description describes a hybrid technique, that uses ISTA and IHT (Iterative Hard Thresholding), in order to help resolve this problem without issues caused by using a least-squares technique. Thus, FIG. 2C illustrates results 230 of using both ISTA and IHT in the CSI algorithm. The results 230 may be further improved by using a temporal colocation constraint or assumption for the 'intercept' and 'gradient' reflection coefficients, as illustrated in the results 240 of FIG. 2D. The effectiveness of these hybrid techniques may be understood from a Bayesian perspective as alleviating prior constraints. Thus the underestimation of higher order AVO equations may be resolved, while maintaining the ability to have model selection and L1 regularization in all dimensions of the problem.

In previously proposed approaches, a least-squares inversion is applied to only the location of strong 'intercept' reflection coefficients from the FISTA inversion to better recover the 'gradient' component. The least-squares inversion that was implemented does not include an L1 regularization that may be needed for stable solutions to more complicated AVA or AVAz inversions. For example, the $3^{rd}$ AVA term (the Far term) is notoriously difficult to estimate unless one has good data quality out to far angles (>40 degrees). A least squares implementation that includes this term without an L1 regularization may result in highly unstable results. Previous approaches may essentially circumvent this problem by assuming that this term is not important—even for pristine data with far offsets—and is truncated ahead of time. However, even the 'gradient' coefficient may be highly biased when data quality is such that noise dominates the angle dependent response. One solution to this problem may be to use the ability of the L1 regularization to truncate these higher order components when the data indicates it is not possible to recover them—without prior assumptions. This approach is described below, to let the data dictate what is resolvable. Also, a benefit of this approach may be that the principle components of the data are recovered (consistent with the restricted isometry property assumption). However, systematic underestimation of higher order components, when they are recoverable, may not desirable and may cause serious issues involving inversion for rock physics if not accounted for.

One proposal is that the underestimation of the gradient term by ISTA is due to the application of soft-thresholding for enforcement of the L1 regularization between steps of the gradient descent (L2 attachment). The corresponding algorithm is shown below. The corresponding algorithm includes steps 1 and 2, which are repeated until convergence.

Step 1 (L2 Attachment):

$$g_i = R_i + \mu W(\omega)^*(W(\omega)^* R_i(\omega) - S(\omega)), \text{(Fourier Domain)} \quad 1$$

$$G = U\Sigma V^T, \sigma = \text{diag}(\Sigma)(\text{AVA basis to SVD basis}) \quad 2$$

Step 2 (L1 Regularization):

$$f = \sum \frac{1}{\sigma^2} F(\sigma\langle g(t)|u_k\rangle)v_k (SVD/\text{Time Doman - for all angles}) 3$$

$$F(x) = \begin{cases} x - T & \text{if } x > T \\ x + T & \text{if } x < T \\ 0 & \text{if } |x| < T \end{cases},$$

where $T = \lambda\mu/2$ – Soft Threshold Rule

In the gradient descent and SVD steps we are minimizing an L2 norm, and it is the square of the residual that dictates the fit and magnitude of the update step. When a very small component of the model, in terms of the eigenvalues, is incorrect—the associated squared residual may be extremely small. However, if a principal eigenvalue of the model is incorrect, the squaring of the relatively larger residual may dominate the update. This problem may be encountered in iterative optimization techniques and may be treated by a preconditioner, or regularization, that rebalances the contrasts in eigenvalues (a.k.a. improves the condition number). In the ISTA algorithm, the soft-thresholding rule may not only truncate near zero coefficients, but may also shrink all other coefficients by a constant amount. These 'shrunk' coefficients may be expanded back out when updated by the L2 attachment step—if the data supports it. However, the 'shrunken' coefficients associated with components with eigenvalues close to the noise level may not be expanded out as much as those associated with larger eigenvalues because of the nature of L2. In the method described herein, it is not obvious how one might apply a pre-conditioner without causing biases. However, the shrinkage of coefficients above the threshold level can be turned off as the algorithm approaches convergence.

Iterative techniques that threshold without shrinkage may be referred to as iterative hard-thresholding techniques. This technique allows the underestimated (the lower eigencomponents) to slowly expand out to the best fit without being 'shrunk' in intermediate steps.

Hard Thresholding Rule:

$$F(x) = \begin{cases} x & \text{if } x > T \\ x & \text{if } x < T \\ 0 & \text{if } |x| < T \end{cases},$$

where $T = \lambda\mu$.

The hard-thresholding approach may however be more sensitive to noise in tests. (It was noticed in numerical experiments that the benefit of the soft-thresholding is to prevent over sensitivity to noise and outliers.) So, a hybrid approach may be to use ISTA, or FISTA, to get the model close to optimal, and then a small number of IHT iterations may be applied to allow the expansion of the overly shrunken coefficients. This approach may still truncate coefficients that are dominated by noise and fits with our philosophy of parsimony. This ISTA/IHT approach may be used when the signal to noise ratio is large, but further improvements can be made by including a temporal co-location constraint that assumes that the 'gradient' reflection coefficients are associated with 'intercept' (or $1^{st}$ principal eigenvalue) coefficients that are above the noise level and apply hard-thresholding.

Co-location and Hard Thresholding Rules:

$x_1 \ldots n=0$ If $x_1 < \sigma$, where $x_n$ are the ordered principle components of the data at time t, and $\sigma$ is the $1^{st}$ standard deviation of the noise.

If $x_1 > \sigma$ then $$F(x) = \begin{cases} x & \text{if } x > T \\ x & \text{if } x < T \\ 0 & \text{if } |x| < T \end{cases},$$

where $T = \lambda\mu$.

This may help to ameliorate the sensitivity of IHT (or least-squares) to noise. The only caveat with this co-location assumption is in cases, such as class 2 AVO anomalies, where there is not a strong intercept or mean, but there is a strong gradient component. Both of these new approaches may solve the problem of underestimating the gradient, or higher order terms, without sacrificing the model selection capability and the stability of L1 regularization. This L1 regularization may be used for the more complicated case of AVAz where the correct anisotropy model is often not known a priori.

Theoretical Perspective:

Theoretical and empirical evidence demonstrate that hard thresholding has less bias, but more variance, than soft-thresholding with wavelet applications. Also, in wavelet thresholding, where both hard and soft thresholding rules have been applied, hard thresholding rules may better preserve sparse peaks better than soft thresholding.

The effectiveness of hard thresholding for estimating sparse spike peaks may be explained from a Bayesian perspective. The typical soft-thresholding rule is equivalent to placing a double exponential, or Laplacian, prior probability distribution function (p.d.f.) model on the inversion problem. This 'long tailed' distribution provides for high probability of wavelet (or reflection) coefficients at zero—as well as a significant probability of large coefficients. Hard-thresholds are equivalent to an improper prior, where the prior p.d.f. is uniform everywhere except below the threshold—where all of the density falls on zero. This essentially means that all possible outcomes are equally likely except below the threshold where only zero is a possible solution. This is equivalent to a general form of penalized least-squares inversion.

The systematic underestimation of the gradient coefficients may thus be understood as a "Bayesian whisper" problem, or screening problem. The posterior probability distribution is the product of both the likelihood function, which for our case is described by a multivariate Gaussian distribution, and the prior p.d.f., which for soft-thresholding is a Laplacian. When the likelihood function is not very informative with respect to the 'gradient' component (i.e.: a very small eigenvalue just above noise) the product of the prior with the likelihood may be strongly dominated by the prior. Therefore, in iterative optimization techniques such as ISTA or FISTA, there may be a tendency to converge towards, but not to, the global solution because of the restraint placed by the prior. However, the benefit of the soft-thresholding is to help make the inversion more robust—to help prevent the inversion from becoming overly sensitive to outliers or noise. When the prior is not informative, or a has an uniform p.d.f., there may be no screening effect and the iterative optimizer may converge to the global minima. The application of the least-squares in a hybrid least-squares approach may be effective, without any regularization or prior, because the selected spikes may allow quick convergence to the global minima. Without the L1 regularization from the soft-thresholding leading up to this stage, the problem of the sparse-spike inversion may be highly unstable because of noise and it being underdetermined. The uniform prior of the least-squares solution has the caveat that it may provide a solution even if the signal is dominated by noise. One solution that may prevent both the estimation of coefficients from noise, and the underestimation of smaller eigenvalue components, may include using a hard-threshold. However, as noted before, the hard-thresholded solution tends to have higher variance and results in models with more noise. So, in some embodiments described herein, a method may use the soft-thresholding to approach the minima and then allow a few iterations of the hard-thresholding to allow for timely convergence.

This understanding may also aid in the overall convergence rate of the problem. If one randomly applies hard-thresholding in place of the soft-thresholding during the optimization it may allow for faster convergence by overcoming the screening problem. Also, the understanding of the thresholding from a Bayesian perspective may open the door to other thresholding rules better tailored for the task at hand.

Figure 3:
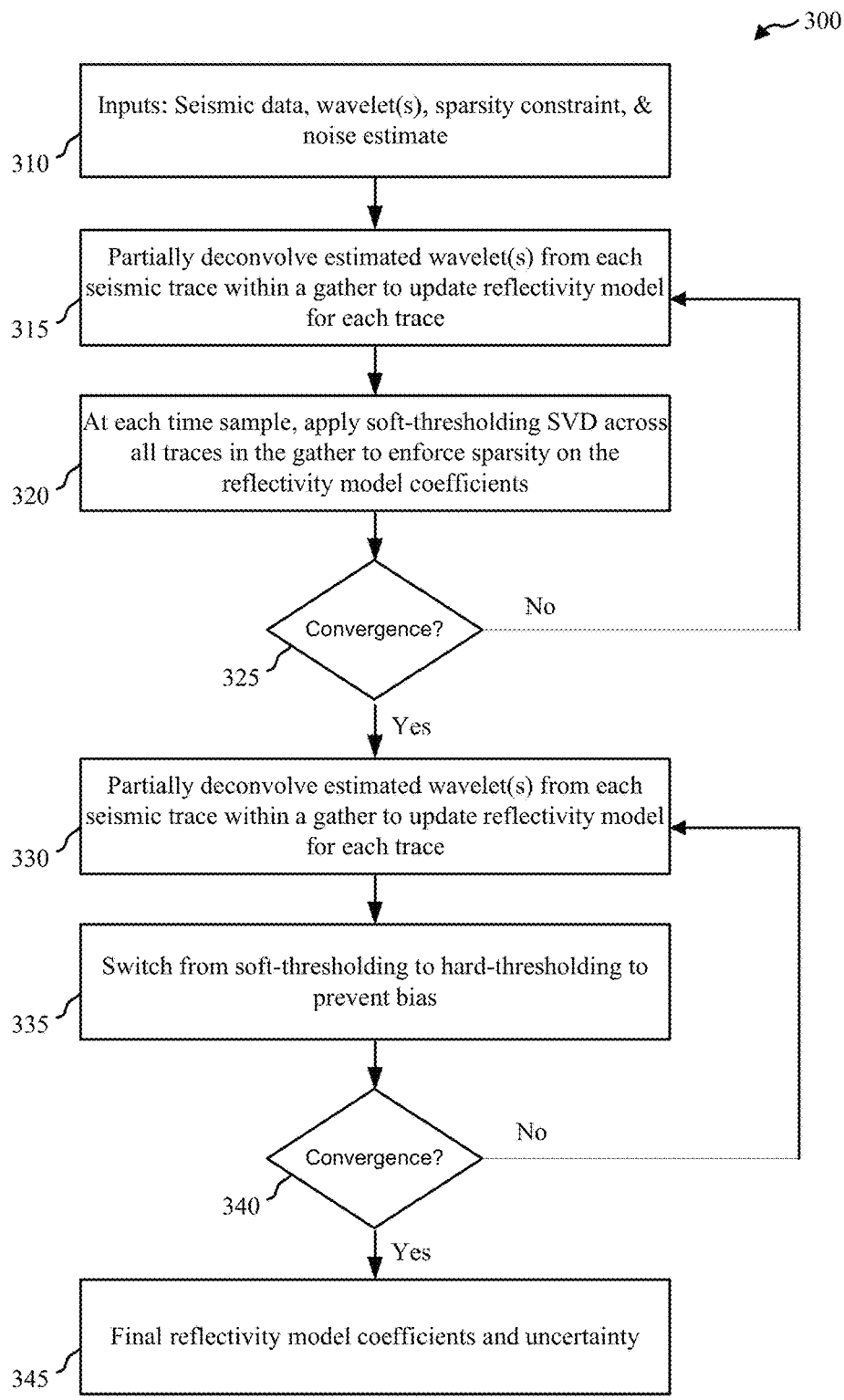
FIG. 3 illustrates a method for determining final reflectivity model coefficients and uncertainty in accordance with aspects of the present disclosure.

Therefore, and for example, FIG. 3 illustrates a method 300 for finding final reflectivity model coefficients and uncertainty. In method 300, seismic data, wavelet(s), sparsity constraints, and noise estimates may be used as inputs (at block 310) to one of the CSI algorithms discussed herein. The selected CSI algorithm may be used to partially deconvolve estimated wavelet(s) from each seismic trace within a gather to update a reflectivity model for each trace (at block 315). At each time sample, a soft-thresholding SVD may be applied across all traces in the gather to enforce sparsity on the reflectivity model coefficients (at block 320). Steps 315 and 320 may be repeated until a certain level of convergence is achieved (block 325). Once this predetermined level of convergence is achieved, the algorithm may be continued to be applied, except now hard-thresholding may be used. Thus, at block 330, the selected CSI algorithm may be used to partially deconvolve estimated wavelet(s) from each seismic trace with a gather to update a reflectivity model for each trace. At block 335, the switch may be made from soft-thresholding to hard-thresholding to prevent bias. Steps 330 and 335 may be repeated until a further predetermined level of convergence is achieved (at block 340), thus resulting in a determination of final reflectivity model coefficients and uncertainty (at block 345).

Bayesian CSI for 3-Term Inversion of Vp, Vs and Density from Rpp Data

Solving for P-wave velocity, S-wave velocity and density from unconstrained inversion of PP seismic amplitude variation with angle (AVA or AVO) data, of typical data quality (20+dB S/N) and angles (<45), using linearized Zoeppritz equations can be challenging. This is in part because the inverse problem may not be 'identified' owing to the fact that in most cases the smallest eigencoefficient of the inverse problem is less than or equal to the noise levels. Barring dramatic improvements in acquisition and/or processing or novel innovations in inversion that may make this problem tractable, some constraints may need to be placed on the possible range of values of Vp, Vs, and rho (density) to get sensible results. The present disclosure provides a method to constrain the inversion of Vp, Vs and rho within the constructs of Compressed Seismic Inversion (CSI). This may include using well logs to make statistical models relating the robust attributes of AVA inversion ($1^{st}$ and/or $2^{nd}$ Eigen-coefficients or the Intercept and/or Gradient) with perturbations in Vp, Vs, and density. Using CSI for the purpose of model selection, where resolvable interfaces and attributes are determined in an L1 sense, the statistical models may be used to construct a prior model (means and covariance matrix) of the 1-D subsurface distribution of Vp, Vs and density. This prior model may then be updated in a Bayesian framework using Bayesian Least-Squares. This method may be effective in improving the prior model of seismic properties for typical conditions, although the posterior estimates may be (highly) correlated. This may be problematic for anomalous rock physics conditions where Vp, Vs and rho are not naturally correlated (e.g. fizz gas). For data of nearly ideal quality (r.f.c. noise <0.005 and angles from 3 to 60 degrees), accurate estimates of the seismic properties with minimal correlation may be achieved. In poor conditions, the inversion may largely reduce to the outputting the prior model.

Bayesian Estimation Framework

Some embodiments of the present disclosure may use a Bayesian estimation framework for estimating seismic properties (perturbations in Vp, Vs, and ρ—or just P for properties) and their associated uncertainty from reflection seismic sparse-spike inversion results. The posterior p.d.f. of the properties (P) as a function of reflection seismic angle gathers (S) may be given by, $$p(P|S) = N \cdot p(S|P) \cdot p(P),$$

where N is the normalization factor, p(S|P) is the likelihood function relating the conditional probability of the reflection seismic angle gathers (S) given the properties, and p(P) is the prior probability of the property of interest.

Building the Prior: Model Selection and Statistical Models

The selection of the proper representation of the subsurface—or in other words—determining the location and distribution of subsurface interfaces—can be challenging in some cases. In addition, determining the amount of independent information available from field amplitude variation with angle (AVA or AVO) data can be important for understanding what prior constraints may need to be applied for a successful inversion. Given the framework of the location and distribution of subsurface interfaces and resolvable independent AVA information, we can in some embodiments build a prior model based on statistical models that relate well log information to the selected model. This prior model may provide the constraints to ensure that inversion results are physically plausible—even when the data is of insufficient quality for inversion to uniquely identify Vp, Vs and density.

CSI for Model Selection

The seismic model used in the present disclosure may assume a weak interaction between reflectors that may allow us to express seismic data and reflectivity with a convolutional model expressed as, $$S(\theta,t)=W(\theta,t)*R(\theta,t)+n(\theta,t), \quad (1)$$

where $S(\theta,t)$ is the seismic signal at multiple angles $\theta$, $W(\theta,t)$ is the seismic wavelet, $R(\theta,t)$ is the reflectivity series for each angle $\theta$, and $n(\theta,t)$ is the noise. The inverse problem is to recover $R(\theta,t)$ from the seismic and source wavelet by searching for models of $R(\theta,t)$ that minimize the norm of the observed seismic and the proposed synthetic seismic. For an inconsistent set of linear equations, which arise when a system is noisy or poorly conditioned, regularization may be needed to find a stable solution to the inverse. In the typical L2 norm case, the minimization function becomes, $$f=|W(\theta,t)*R(\theta,t)-S(\theta,t)|^2+\lambda|R|^2, \quad (2)$$

where $\lambda$ is the weighting term for the regularization. In a Bayesian sense, the L2 regularization term implies a Gaussian model covariance, and may be equivalent to a prior smoothing constraint that essentially removes any sharp discontinuities from the resulting inversion as $\lambda$ increases to allow convergence to norm. This infinitely smooth model of the Earth is inconsistent with outcrop observations of the abrupt discontinuities in lithology marking formation boundaries. It's also inconsistent with the observation from well logs that reflectivity is better approximated with a double sided exponential distribution (e.g. . . . ). An alternate regularization to the problem that doesn't result in a smoothed representation of the system is to use a L1 norm regularization term. The L1 norm regularization implies a double sided exponential model covariance, and promotes a sparse and sharp representation of the solution, $$f=|W(\theta,t)*R(\theta,t)-S(\theta,t)|^2+\lambda|R|^1. \quad (3)$$

This function (equation 3) is a mixed norm, with L2 on the model discrepancy and a L1 on the regularization, that implies a Gaussian error model (L2), while the L1 enforces that the model of reflectivity has a sparse-spike representation.

Embodiments of CSI described herein may utilize an iterative soft thresholding algorithm (ISTA) for solving linear inverse problems with a sparsity constraint. The use of using surrogate functionals (g) may simplify the process. These surrogates are relatively simple to minimize via an iterative convex optimization method with proven convergence to norm.

In this version of the CSI algorithm, steps 1 and 2 are repeated until convergence.

Step 1. $g=R_i+\mu W^-(\omega)*(W(\omega)*R_i(\omega)-S(\omega))$, (Fourier Domain), where $\mu=1/\max(|W(\omega)|^2)$ Step 2.

$$F(g(t)) = \begin{cases} g(t)-T & \text{if } g(t) > T \\ g(t)+T & \text{if } g(g) < T, \\ 0 & \text{if } |g(t)| < T \end{cases}$$

where $T = \lambda\mu/2$ (Time Domain).

This technique uses a soft thresholding rule F(g) to help eliminate wavelet coefficients (i.e. spikes) that fall below noise levels while iterating towards a sparse set of coefficients that fit observed seismic data. The end result may be a model that has preserved reflections resolvable by the bandwidth of the seismic above noise—without smoothing.

This method may originally be applicable to single 'stacked' seismic data traces. A stack constructed from the sum of linearly independent stacks however can be used to find a solution to multiple stacks, or a gather, by providing a codependence between all of the stacks. With the sum stack, a non-linear correlation model that imposes a soft constraint that the spikes are positioned at the same locations for every stack may relate all of the reflectivity series. The use of linear independence of the stacks here can be extended to other contexts by using singular value decomposition (SVD) so that the stacks are independent.

Pre-Stack Compressed Seismic Inversion

The equations of Aki and Richards and Shuey provide a linear system of equations that link estimated seismic reflection coefficients R to perturbations $\Delta$ in density, Vp and Vs:

$$R_{pp}^{iso}(\theta) = \frac{1}{2}\left(\frac{\Delta\rho}{\rho} + \frac{\Delta vp}{vp}\right) + \left(-2\frac{vs^2}{vp^2}\frac{\Delta\rho}{\rho} + \frac{1}{2}\frac{\Delta vp}{vp} - 4\frac{vs^2}{vp^2}\frac{\Delta vs}{vs}\right)\sin^2\theta + \frac{1}{2}\frac{\Delta vp}{vp}\sin^2\theta\tan^2\theta$$

These AVO equations can be written in matrix form $$R(\theta_n) = \begin{vmatrix} 1 & \sin^2\theta_0 & \sin^2\theta_0\tan^2\theta_0 \\ \vdots & \vdots & \vdots \\ 1 & \sin^2\theta_N & \sin^2\theta_N\tan^2\theta_N \end{vmatrix} \begin{vmatrix} \frac{1}{2} & \frac{1}{2} & 0 \\ -2\left(\frac{\overline{Vs}}{\overline{Vp}}\right)^2 & \frac{1}{2} & -4\left(\frac{\overline{Vs}}{\overline{Vp}}\right)^2 \\ 0 & \frac{1}{2} & 0 \end{vmatrix} \begin{pmatrix} \frac{\Delta\rho}{\rho} \\ \frac{\Delta Vp}{Vp} \\ \frac{\Delta Vs}{Vs} \end{pmatrix} \text{ or}$$

$$R(\theta_n) = \begin{vmatrix} 1 & \sin^2\theta_0 & \sin^2\theta_0\tan^2\theta_0 \\ \vdots & \vdots & \vdots \\ 1 & \sin^2\theta_N & \sin^2\theta_N\tan^2\theta_N \end{vmatrix} \begin{pmatrix} \text{Intercept} \\ \text{Gradient} \\ \text{Far} \end{pmatrix},$$

where the first matrix is the basis function matrix for the seismic gathers, and the second matrix is the a coefficient matrix relating the coefficients of the gather basis functions to the perturbations in density, Vp and Vs. Together they constitute the model G. The bars represent the average of the properties on either side of an interface, or the background trend. These equations as traditionally expressed are not orthonormal and for typical seismic angles may be correlated.

The unknown values of x (our elastic properties, linearized rock physics properties, etc.) may be calculated (or estimated) by first finding the inverse (or pseudoinverse) of M.

$$(G)^{-1}R=x$$

Least-squares may be used to find a solution to inconsistent linear equations (e.g. noisy systems) of m equations and n unknowns—with the requirement that its columns of M are independent and the rank is equal to n. If the system is rank deficient or if the columns are not independent, then the problem may have no solution or may be indeterminate (infinite solutions). This issue arises in seismic inversion when one tries to estimate the $3^{rd}$ 'Far' component of Zeoppritz' Rpp equation at typical offsets. Usually this $3^{rd}$ component is below noise and is largely degenerate with the $2^{nd}$ component at angles less than 40 degrees. The method of Singular Value Decomposition (SVD) may thus be used to find solutions to such problems.

A soft-threshold SVD inversion algorithm may be used, and may be equivalent to regularization with a L1 norm that enforces a parsimonious model. SVD may utilize the calculation of eigenvalues and eigenvectors to orthogonalize the system of equations and to find zero valued or nearly zero singular values (singular values=square root of eigenvalues). An n by m matrix G can be factored into:

$$G = U\Sigma V^T$$

where U is an m by m matrix consisting of columns populated with the eigenvectors of $GG^T$, and V is a n by n matrix consisting of columns populated with the eigenvectors of $G^TG$. The matrix $\Sigma$ is a diagonal matrix of the square roots of the eigenvalues for both $GG^T$ and $G^TG$. In this decomposition the pseudoinverse of G is given by:

$$G^{-1} = V\Sigma^{-1}U^T,$$

The truncation of zero or nearly zero singular values from the problem may allow one to optimally calculate the remaining system of equations. From another perspective, one is improving the condition number—which is calculated as the ratio between the largest and smallest eigenvalue—of the matrix without introducing Tikhonov regularization and its side effects.

Traditionally, the truncation of the smallest singular values is done by cutting all those that fall below a predetermined threshold. There may be no explicit connection to the data. Alternatively, a soft-thresholding approach may be used that directly considers the data g(t) by first projecting the eigenvector onto the data prior to thresholding.

$$f = \sum \frac{1}{\sigma^2} F(\sigma \langle g(t) | u_k \rangle) v_k$$

$$F(x) = \begin{cases} x - T & \text{if } x > T \\ x + T & \text{if } x < T \\ 0 & \text{if } |x| < T \end{cases}$$

where $T = \lambda \mu / 2$.

This method may preserve otherwise truncated terms when the rock properties are such that a strong response from small singular components occurs. This may capture both the ability to orthogonalize our known reflectivity equations, while honoring the variability of the data. In essence this procedure is a model selection method. The soft-thresholding SVD approach may be consistent with the assertion that the solutions should be sparse on a predefined orthonormal basis. Because the offset/angle domain is orthonormal to the time axis in our problem and the 'stacks' formed by the SVD are orthonormal, we may then insert the pre-stack SVD inversion into the original algorithm (with steps 1, 2, and 3 repeated until convergence):

Step 1. $g_i = R_i + \mu W(\omega)^*(W(\omega)^*R_i(\omega) - S(\omega))$, (Fourier Domain).

Step 2. $G = U\Sigma V^T$, $\sigma = \text{diag}(\Sigma)$ (AVA basis to SVD basis).

Step 3.

$$f = \sum \frac{1}{\sigma^2} F(\sigma \langle g(t) | u_k \rangle) v_k \quad \text{(SVD/Time Domain—for all angles)};$$

$$F(x) = \begin{cases} x - T & \text{if } x > T \\ x + T & \text{if } x < T \\ 0 & \text{if } |x| < T \end{cases}$$

where $T = \lambda \mu / 2$.

This may also allow researchers to view the amount of independent information (eigenvalues/vectors) that can be used to discriminate rock properties or geologic facie for building the prior model. For example, one may find that the noise levels and available offsets are such that only one or two eigen-coefficient may be estimated—when three is needed to uniquely estimate Vp, Vs and density. Therefore the prior statistical constraints may be built on regressions involving the resolvable attributes (say the $1^{st}$ eigen-coefficient) to perturbations in Vp, Vs and density. The prior may be improved if 2 eigen-coefficients are resolvable or unnecessary if all 3 can be robustly estimated. In other words, one may know the dimensionality that a problem needs to be reduced to.

Building the Statistical Model

Once one has determined what seismic attributes are resolvable from CSI, one may develop a statistical model relating those seismic attributes with perturbations in Vp, Vs, and density. Linear regression models relating the resolvable seismic attributes and our properties of interest—along with the standard error of the mean and coefficients—may be used to build the prior constraints. Building the statistical model may include 1) selecting quality logs, 2) upscaling the data with median filters and Backus averaging, 3) calculating the perturbations in the Vp, Vs, and density—as well as the eigen-coefficients for the seismic geometry and noise levels, 4) making robust regression models using iteratively reweighted least-squares (IRLS), and 5) using the model and standard errors—calculate prior covariance matrix.

Figure 4:
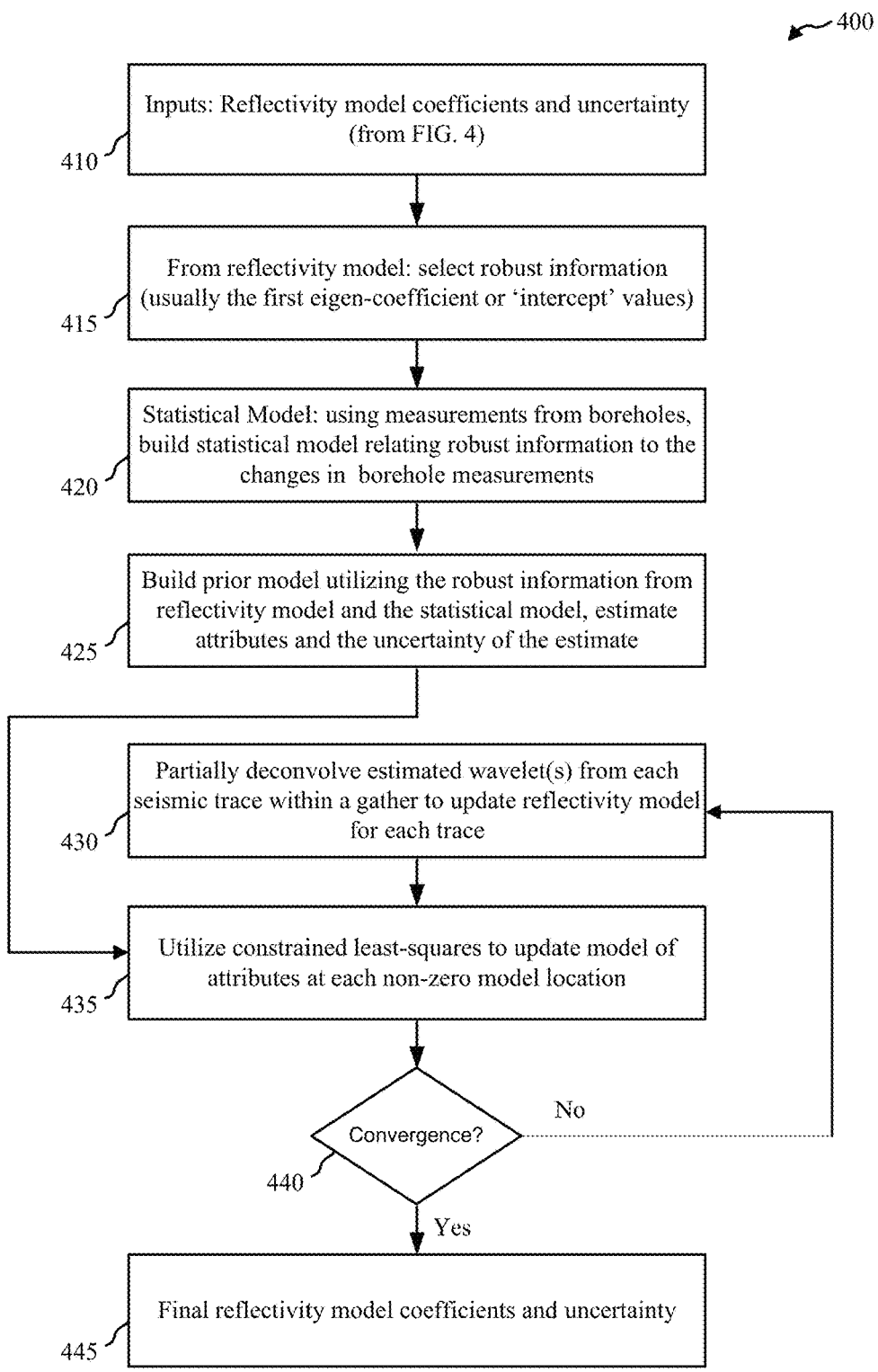
FIG. 4 illustrates a method for determining final reflectivity model coefficients and uncertainty in accordance with aspects of the present disclosure.

FIG. 4 illustrates a method 400 of how the statistical model may be used in building a prior model for determining a final attribute model and uncertainties for use in absolute property estimation. In method 400, the reflectivity model coefficients and uncertainty determined from FIG. 3 may be used as inputs (at block 410). From the reflectivity model, one may select (at step 415) robust information, usually the first eigen-coefficient or 'intercept' values, to be used in building a prior model. A statistical model may be built using measurements from boreholes (at step 420). The statistical model may relate the robust information from step 415 to the changes in borehole measurements. At step 425, one may build the prior model utilizing the robust information from the reflectivity model and the statistical model, and estimate attributes and the uncertainty of the estimate. Therefore, steps 415, 420, and 425 may represent the building of the prior model. At block 435, one may utilize constrained least-squares to update model of attributes at each non-zero model location. As long as convergence is not achieved, steps 430 and 435 are repeated, where step 430 includes partially deconvolving estimated wavelet(s) from each seismic trace within a gather to update a reflectivity model for each trace. The result is a determination of a final attribute model and uncertainties for use in absolute property estimation (at block 445).

Bayesian Interpretation of Least-Squares Inversion of Estimated Reflection Coefficients The equations of Aki and Richards and Shuey may provide a linear system of equations that link estimated seismic reflection coefficients R to perturbations Δ in density, Vp and Vs:

$$R(\theta_n) = \begin{vmatrix} 1 & \sin^2\theta_0 & \sin^2\theta_0\tan^2\theta_0 \\ \vdots & \vdots & \vdots \\ 1 & \sin^2\theta_N & \sin^2\theta_N\tan^2\theta_N \end{vmatrix} \begin{vmatrix} \frac{1}{2} & \frac{1}{2} & 0 \\ -2\left(\frac{Vs}{Vp}\right)^2 & \frac{1}{2} & -4\left(\frac{Vs}{Vp}\right)^2 \\ 0 & \frac{1}{2} & 0 \end{vmatrix} \begin{pmatrix} \frac{\Delta\rho}{\bar{\rho}} \\ \frac{\Delta Vp}{\overline{Vp}} \\ \frac{\Delta Vs}{\overline{Vs}} \end{pmatrix},$$

where the first matrix is the basis function matrix for the seismic gathers, and the second matrix is the a coefficient matrix relating the coefficients of the gather basis functions to the perturbations in density, Vp and Vs. Together they may constitute the model G. The bars represent the average of the properties on either side of an interface, or the background trend.

The likelihood function relating the probability of the observed reflectivities to the perturbations in density, Vp and Vs, $$p(R|P) = \sim \exp\left\{-\frac{1}{2}\left(G\begin{pmatrix} \frac{\Delta\rho}{\bar{\rho}} \\ \frac{\Delta Vp}{\overline{Vp}} \\ \frac{\Delta Vs}{\overline{Vs}} \end{pmatrix} - R(\theta_n)\right)^T C_D^{-1}\left(G\begin{pmatrix} \frac{\Delta\rho}{\bar{\rho}} \\ \frac{\Delta Vp}{\overline{Vp}} \\ \frac{\Delta Vs}{\overline{Vs}} \end{pmatrix} - R(\theta_n)\right)\right\},$$

where G is the model above, $C_D$ is the data covariance matrix describing the variance structure of the reflection coefficients. The natural log of the likelihood function is commonly referred to as the Chi-squared. Typically the data covariance matrix assumes that each measurement has uncorrelated errors and has only auto-variances along the diagonal.

The least-squares minimization equation can be derived from the log of the likelihood function by finding the derivative of the function set to zero.

$$\begin{pmatrix} \frac{\Delta\rho}{\bar{\rho}} \\ \frac{\Delta Vp}{\overline{Vp}} \\ \frac{\Delta Vs}{\overline{Vs}} \end{pmatrix} = \begin{pmatrix} \frac{\Delta\rho}{\bar{\rho}} \\ \frac{\Delta Vp}{\overline{Vp}} \\ \frac{\Delta Vs}{\overline{Vs}} \end{pmatrix}_0 - (G^T C_D^{-1} G)^{-1} G^T C_D^{-1}\left(g\begin{pmatrix} \frac{\Delta\rho}{\bar{\rho}} \\ \frac{\Delta Vp}{\overline{Vp}} \\ \frac{\Delta Vs}{\overline{Vs}} \end{pmatrix}_0 - R\right),$$

This system of equations may be poorly conditioned (i.e. larger difference between largest and smallest eigenvalues, or poor SNR), requiring regularization. In a Bayesian interpretation of regularization a prior model covariance matrix $C_m$ may be used in place of the of the Tikhonov regularization term and may imply a Gaussian model. This model covariance matrix may encompass differing levels of uncertainty and off diagonal correlation, and may allow one to 'lock down' model variables. The combination of the prior model mean and model covariance matrix may constitute the prior of Bayes theorem.

$$\begin{pmatrix} \frac{\Delta\rho}{\bar{\rho}} \\ \frac{\Delta Vp}{\overline{Vp}} \\ \frac{\Delta Vs}{\overline{Vs}} \end{pmatrix} = \begin{pmatrix} \frac{\Delta\rho}{\bar{\rho}} \\ \frac{\Delta Vp}{\overline{Vp}} \\ \frac{\Delta Vs}{\overline{Vs}} \end{pmatrix}_0 - (G^T C_D^{-1} G + C_m^{-1})^{-1} G^T C_D^{-1}\left(g\begin{pmatrix} \frac{\Delta\rho}{\bar{\rho}} \\ \frac{\Delta Vp}{\overline{Vp}} \\ \frac{\Delta Vs}{\overline{Vs}} \end{pmatrix}_0 - R\right).$$

Aside from the regularization issue, problems may arise when the true data covariance matrix of the population differs significantly from the sample covariance matrix, and they have off diagonal terms not accounted for in the sample covariance matrix. This may be the case where coherent/correlated errors distort the observations and these errors cannot be separated from signal. This may lead to biases in the estimates of the properties of interest if not accounted for ahead of this step.

The posterior mean and covariance matrix may be directly estimated from the inversion results. The mean may be the least-squares solution to the properties, while the posterior covariance matrix may be derived from the prior data covariance matrix and local curvature:

$$C_{m(post)} \sim (G^T C_D^{-1} G + C_m^{-1})^{-1}$$

Because the above is an estimate of the full posterior covariance matrix, one may detect correlations in the estimate indicating trouble in uniquely identifying the properties without additional constraint.

Error Propagation:

Linear regression between the estimated seismic attributes (independent variables) from logs and the perturbations in Vp, Vs and rho (dependent variables) may provide the standard error of the mean (sem.), and the standard error of the coefficients (sec.) (e.g. slope). However, these geophysical log based regressions may neglect that the seismic attributes estimated from logs are taken as known, while real seismic attributes determined by inversion may have significant uncertainty. Therefore, the actual prior built from the statistical model and inversion may propagate the errors in both estimates. For the linear case, y=coef*A+b, the linear error propagation is $$\sigma^2_{coef*A} = (coef*A)^2\left[\left(\frac{\sigma_A}{A}\right)^2 + \left[\left(\frac{\sigma_{sec}}{coef}\right)^2 + 2\left(\frac{cov_{A,sec}}{A*coef}\right)\right]\right]$$

$$\sigma^2_y = \sigma^2_{sem} + \sigma^2_{coef*A} + 2cov_{A,sem}$$

If one assumes that the errors in the inversion for model selection are independent of the errors in the regression (decent assumption), one may neglect the last term in the error propagation equations related to covariance. The covariance terms in the prior model covariance matrix may utilize the previous correlation (p) values between the attributes (Vp, Vs, and rho) with the new estimates of the variance:

$$cov_{i,j} = p_{i,j}\sigma_i\sigma_j$$

The prior model may, if it is too informative, have real anomalous AVO response not within the realm of the prior may be screen out. This may result in inversion results where the anomalous properties do not fall within the confidence intervals. This problem may be minimized by either adding a safety factor (say 50%) that expands the prior distribution, or by including geostatistical variogram models where by the variance increases in a prescribed manner as one moves away from the wells used in the development the statistical model.

In both FIGS. 3 and 4, noise is estimated from the mean squared residuals from differences between the observed seismic gathers and the modeled seismic gathers at each iteration of the loops (in FIGS. 3 and 4). These updated noise levels may be used to adapt the thresholding. The estimation of the noise is done separately on each gather and can be windowed in time.

Thus, an import aspect of the Bayesian implementation is the ability to objectively weigh the contribution of the seismic in the likelihood function and the influence of the prior. This requires good estimates of the noise. Noise estimation can be done off line using other methods, or can be estimated during the inversion as an additional unknown. For example, an EM algorithm could be further extended to include estimation of unknown noise. The noise update step may therefore be given by:

$$\hat{\sigma}^{2(t+1)} = \frac{\left\| H\hat{x}^{(t+1)} - y \right\|^2}{N}, \quad (18)$$

where x—hat is the current estimate of the true reflectivity, H is the wavelet(s) and y is the observed seismic and N is the number of degrees of freedom, or the number of samples. This noise estimate is updated following each iteration of the algorithm.

Notable Observations:

Even in the extremely noisy/small angle cases, the prior estimate may be updated. This may happen despite the variance of Vp and density being worse in the posterior. This problem may largely be driven by the prior for the Vs is being uninformative compared to the likelihood function. The prior Vs estimate may be based on the regression of Vs from 'Intercept', which may have a significantly larger standard error than the other regressions. However, the regression of Vs from the 'Gradient' component may have a much smaller standard error, and may be improved when using both 'Intercept' and 'Gradient'. Using this multivariate regression may make the prior more informative, and the results may be more reasonable results for high noise levels (the prior may dominate). The 'Gradient' or second eigencoefficient may, however, require better data than just the 'Intercept'. It may also have uncertainty in the estimate that may be propagated into the prior. The solution may be to build statistical models for both cases, and use logic statements dependent upon the number of independent attributes extracted by CSI.

Figure 5:
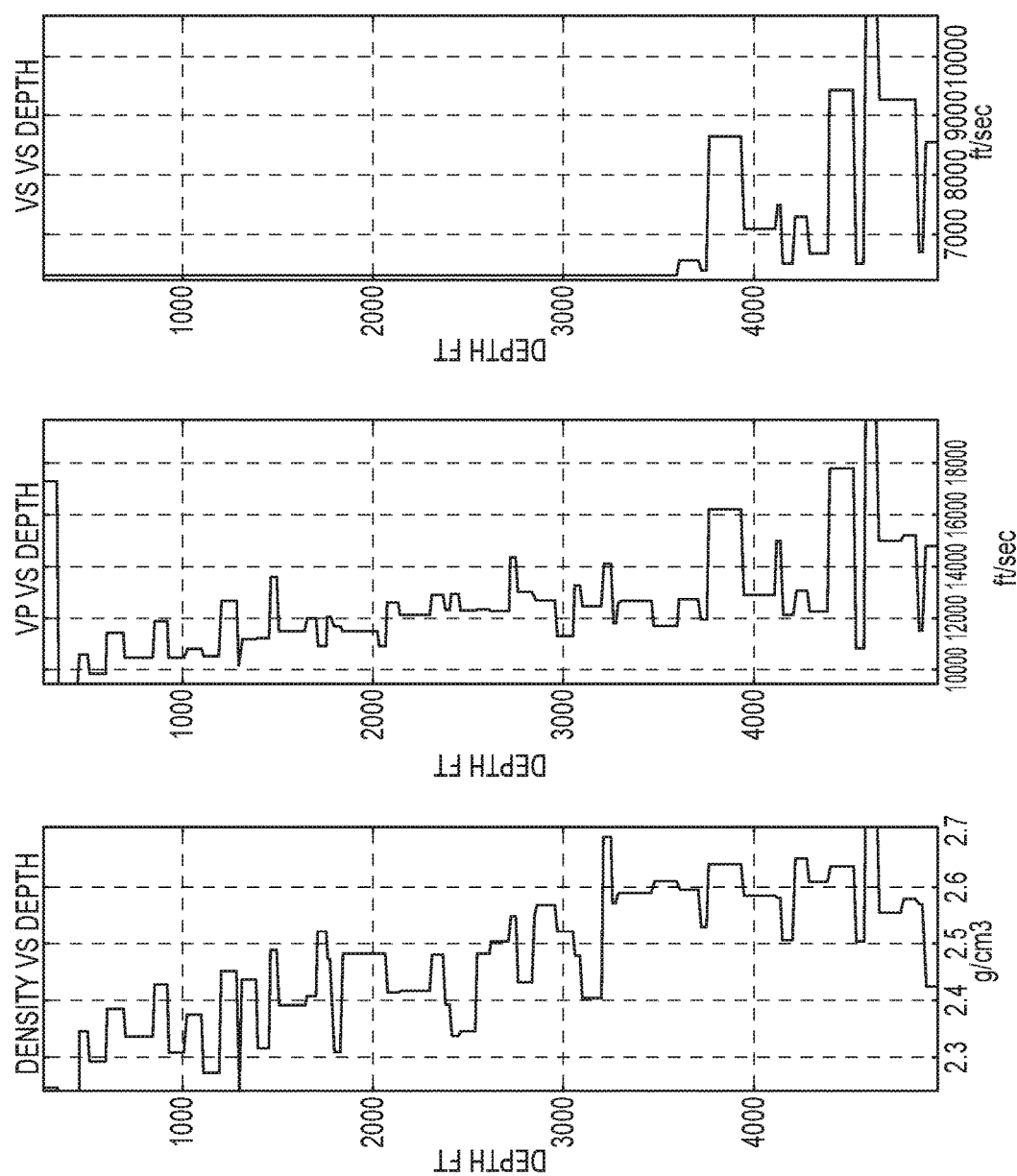
FIG. 5 illustrates CSI upscaled results in accordance with aspects of the present disclosure.

FIG. 5 illustrates related upscaled results. FIG. 5 illustrates both blocked and Backus averaged logs for generating the synthetic. Note that Vs is a constant until approximately 3650 ft depth. The interval used to develop the statistical models are at depths greater than 3650 ft.

Case 1 (The Typical Case)

Figure 6A:
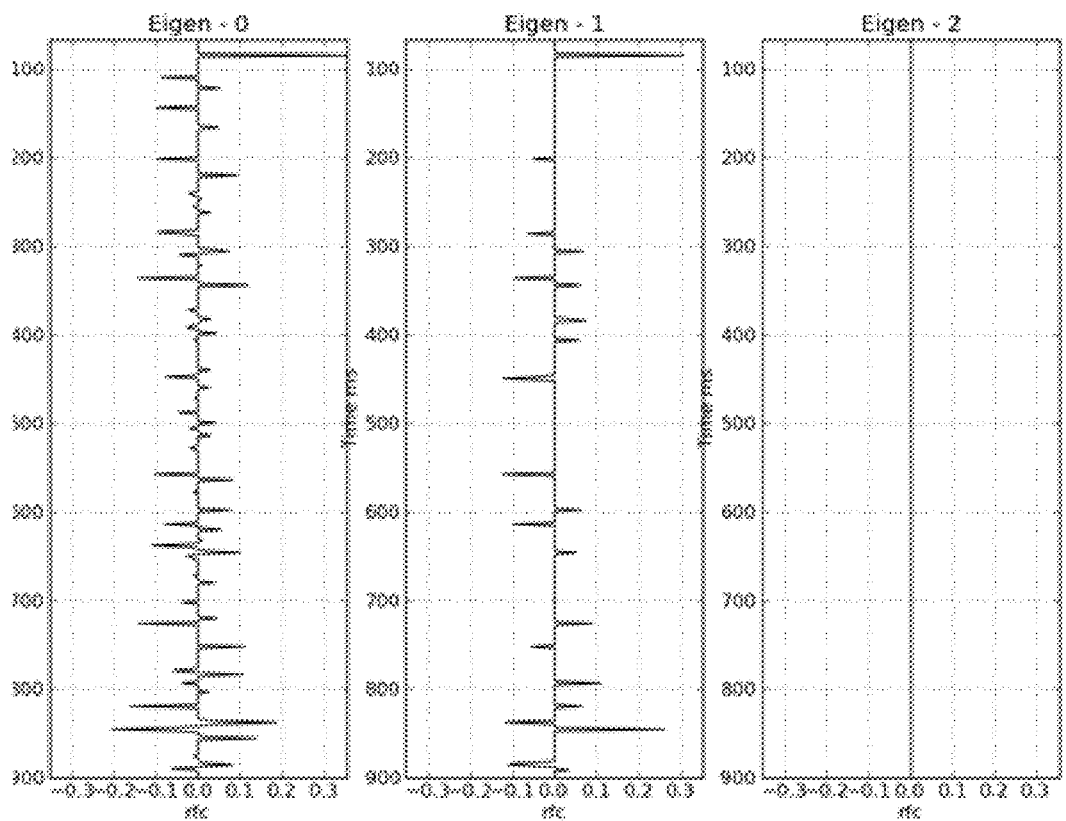
FIGS. 6A-6D illustrate a case study example in accordance with aspects of the present disclosure.
Figure 6B:
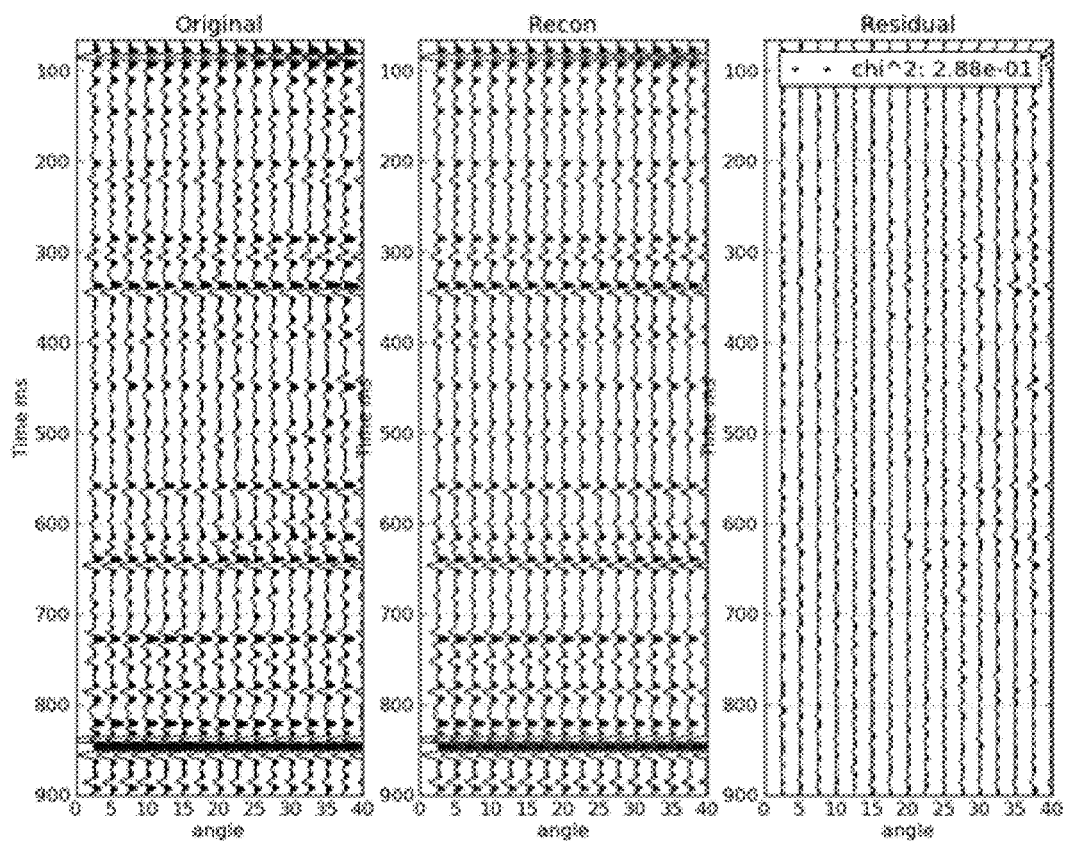

This case is for a r.f.c. noise level of 0.01 (typical of good land-data) and is for angle up to 40 degrees (often possible with land data). FIG. 6A illustrates a plot of the Eigencoefficients determined by CSI that show the resolvable independent information (basis coefficients) need to concisely reproduce the observed seismic data (sans noise). FIG. 6B illustrates residuals of the prior model (background trend related to the 'intercept'). Note that coherent residuals in the far angles are mostly seen in the area above the interval used in the construction of the background model.

Figure 6C:
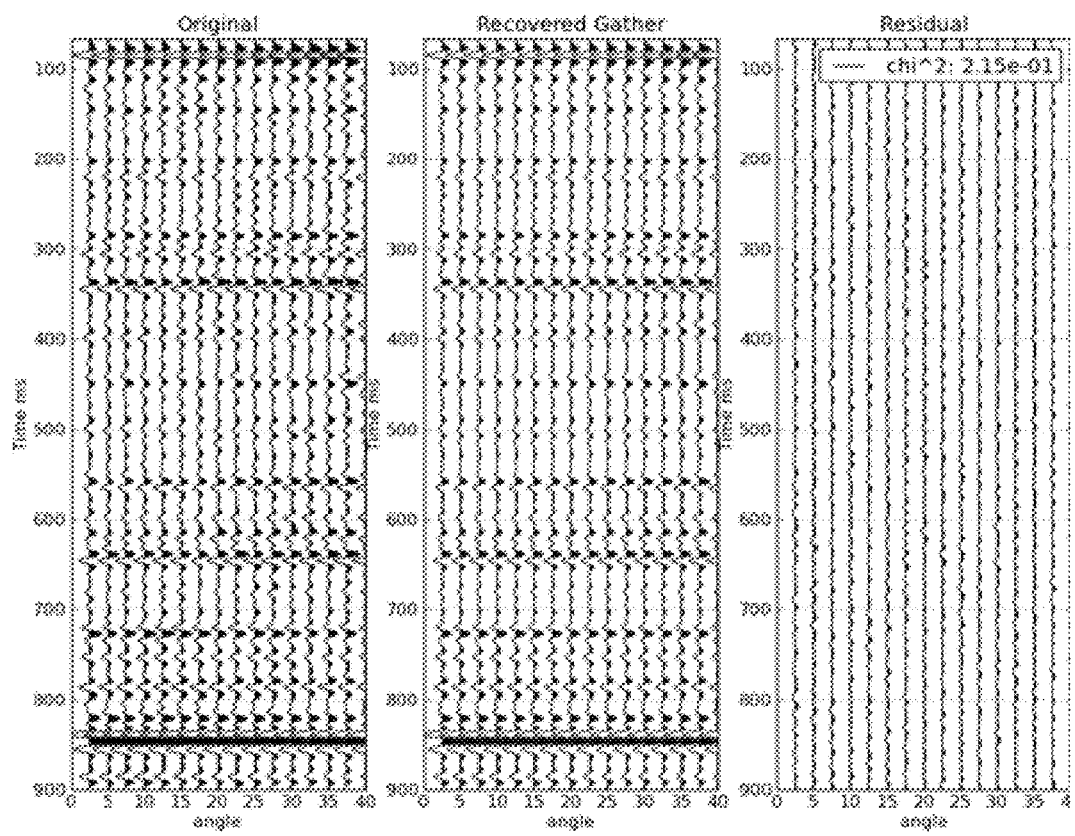
Figure 6D:
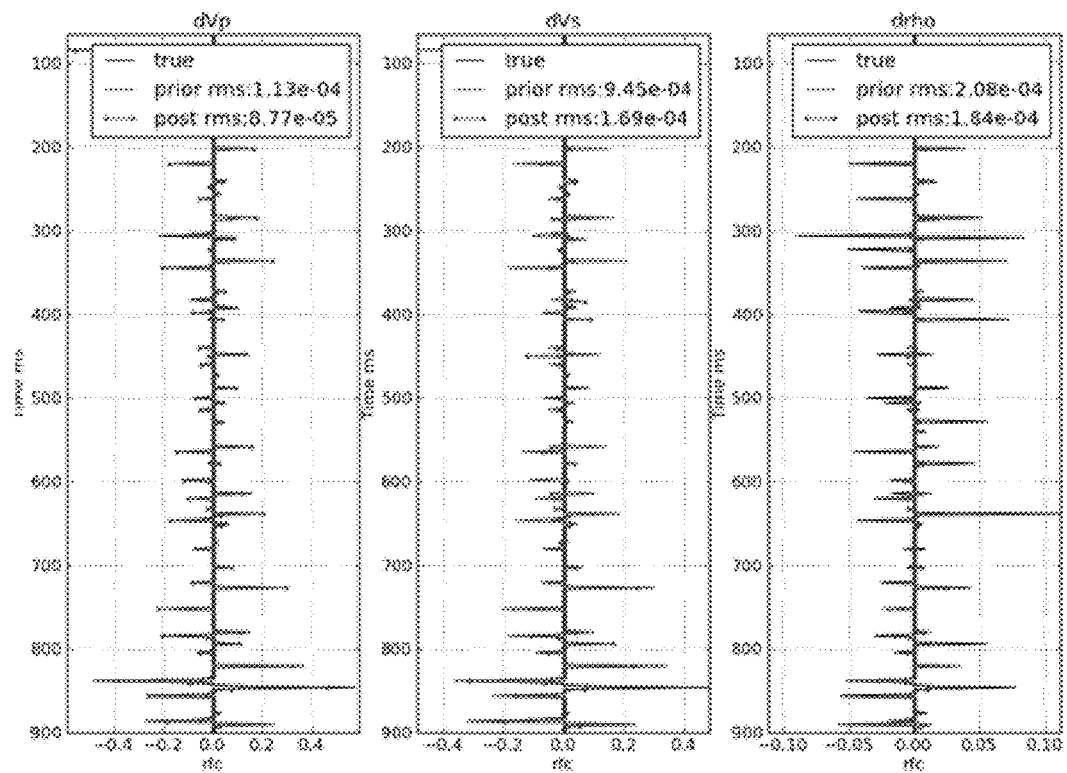

FIG. 6C illustrates residuals of the posterior model. Note than compared to the prior model there is ~25% reduction in Z. Note that the residuals are largely random noise. FIG. 6D illustrates a comparison between prior model, posterior and true values for the perturbations in Vp, Vs, and density. Note that the prior model of Vs (red line) overestimates in the times less than the training interval, while the posterior (green line) is improved. The posterior density estimate is underestimated in the interval above the training interval. This suggests that the inversion may be responding to the sum of the density and Vs perturbations (linearized shear-impedance changes) rather than the individual attributes.

$$Cov = \begin{vmatrix} \sigma_\rho^2 & \sigma_{\rho,Vp} & \sigma_{\rho,Vs} \\ \sigma_{\rho,Vp} & \sigma_{Vp}^2 & \sigma_{Vp,Vs} \\ \sigma_{\rho,Vs} & \sigma_{Vp,Vs} & \sigma_{Vs}^2 \end{vmatrix}$$

Prior Covariance:

$$\begin{bmatrix} 0.00048083 & -0.00048083 & -0.00048963 \\ -0.00048083 & 0.00048083 & 0.00048963 \\ -0.00048963 & 0.00048963 & 0.00538135 \end{bmatrix}$$

Posterior Covariance $$\begin{bmatrix} 0.0004355 & -0.00044167 & -0.0005195 \\ -0.00044167 & 0.00046417 & 0.0005643 \\ -0.0005195 & 0.0005643 & 0.00073454 \end{bmatrix}$$

Case 2 (The Immaculate Case)

Figure 7A:
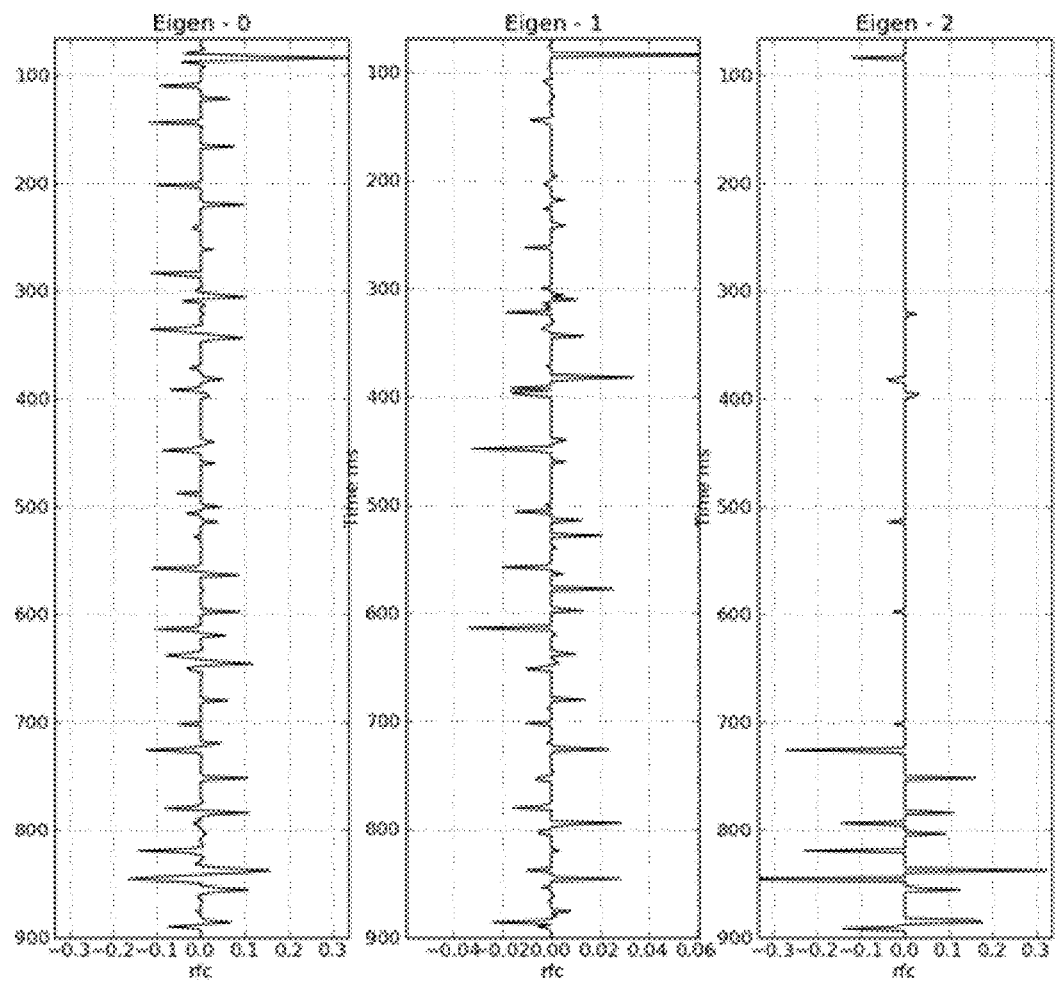
FIGS. 7A and 7B illustrate a case study example in accordance with aspects of the present disclosure.
Figure 7B:
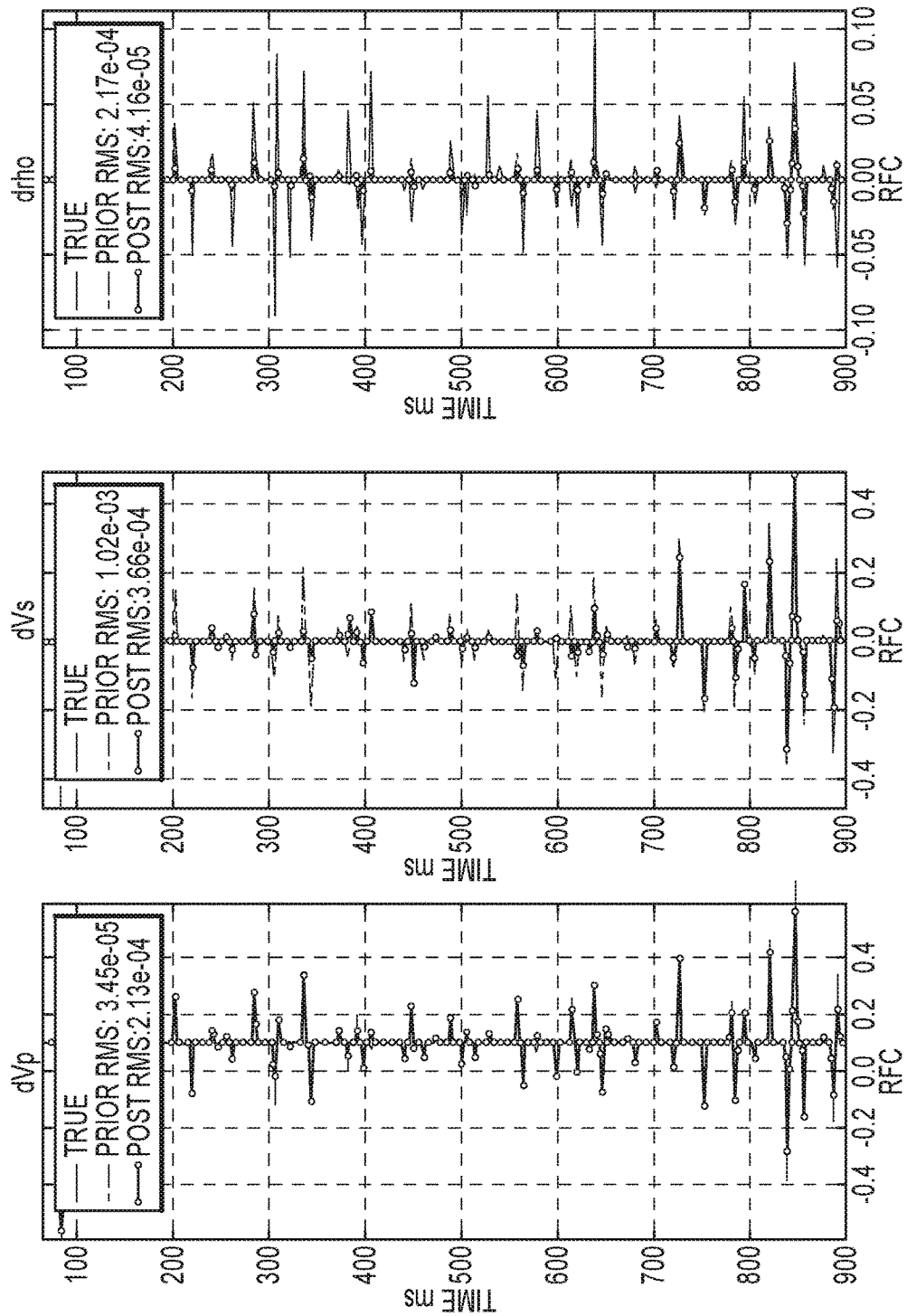

This case is for a r.f.c. noise level of 0.0033 (3x better than a typical good dataset) and is for angle up to 60 degrees (1.5× greater than normally possible with land data). This case ignores than at these angles and contrasts, than many of the reflections may be well past the critical angle at 60 degrees, and therefore the model would be incorrect. While few datasets may be of this quality, it provides a good contrast to Case 1. FIG. 7A illustrates a plot of the Eigencoefficients determined by CSI that show the resolvable independent information (basis coefficients) need to concisely reproduce the observed seismic (sans noise). Note that for Case 2, three eigencoefficients can be estimated. FIG. 7B illustrates a comparison between prior model, posterior and true values for the perturbations in Vp, Vs, and density. Note that the posterior model of Vs is (green line) is improved compared to case 1. The posterior density estimate is improved compared to case 1, even above the training interval. This suggests that the inversion may no longer be strongly correlated and that accurate independent estimates of Vp, Vs and rho are possible.

Prior Covariance:

$$\begin{bmatrix} 0.00048083 & -0.00048083 & -0.00048963 \\ -0.00048083 & 0.00048083 & 0.00048963 \\ -0.00048963 & 0.00048963 & 0.00538135 \end{bmatrix}$$

Posterior Covariance:

$$\begin{bmatrix} [2.07094067e\text{-}05] & -1.90672930e\text{-}05 & -3.19447367e\text{-}05] \\ [-1.90672930e\text{-}05] & 2.70116487e\text{-}05 & 4.91478871e\text{-}05] \\ [-3.19447367e\text{-}05] & 4.91478871e\text{-}05 & 9.38285414e\text{-}05] \end{bmatrix}$$

Moving from Reflectivity to Layer Properties:

Seismic reflectivity may only be sensitive to the contrasts in layers properties, while geoscientist and engineers may also be interested in the properties of the layers themselves. Seismic may also be insensitive to the low-frequency components of layer properties. A final step in the seismic inversion in some embodiments may be to calculate layer properties from reflectivity and provide a low-frequency model to compensate for that insensitivity. For example, the basis coefficients (I-intercept and G-gradient) for a two-term Shuey AVO reflectivity model can be related the contrast in layer P-impedance (Zp) and S-impedance (Zs) by the following relationship.

$$I \cong \tfrac{1}{2} d(\ln(Zp))$$

$$G \cong \tfrac{1}{2} d(\ln(Zp)) - \tfrac{1}{2} d(\ln(Zs))^*$$

A solution for the 1-D P-impedance (Zp) and S-impedance (Zs) model of the Earth through a linear system of equations.

Because the estimates of the reflectivity model may be influenced by uncertainty (errors and noise) the result of this calculation may be unstable. To constrain the solution to reasonable results we may utilize constrained least-squares (aka Bayesian least-squares) to consider the influence of uncertainty and to honor our prior knowledge of the Earth. The equation for this approach may be as follows:

$$x^{new} = x^{bkg} + (A_T C_D^{-1} A + C_x^{-1})^{-1} A^T C_D^{-1} (A x^{bkg} - b)$$

x=ln(impedance)
b=(Intercept/Grad)
where x is the array of the natural log of P-impedance (Zp) and S-impedance (Zs) of length 2*N (N is the number of samples in the seismic trace), A is the matrix of independent parameters, Cd is the data covariance matrix calculated from error propagation in the calculation of the reflectivity, Cx is model covariance matrix (which is prior assumption of the variability for the background model), and b is the intercept and gradient coefficients. After solving for x, the data may be exponentiated to get the final layer properties.

In some cases additional detrending may additionally be needed to stabilize the solution. Here, a high pass filter may be applied to the log impedances prior to the addition of the background model, which may cut low frequency components that are not supported by the seismic data.

Figure 8:
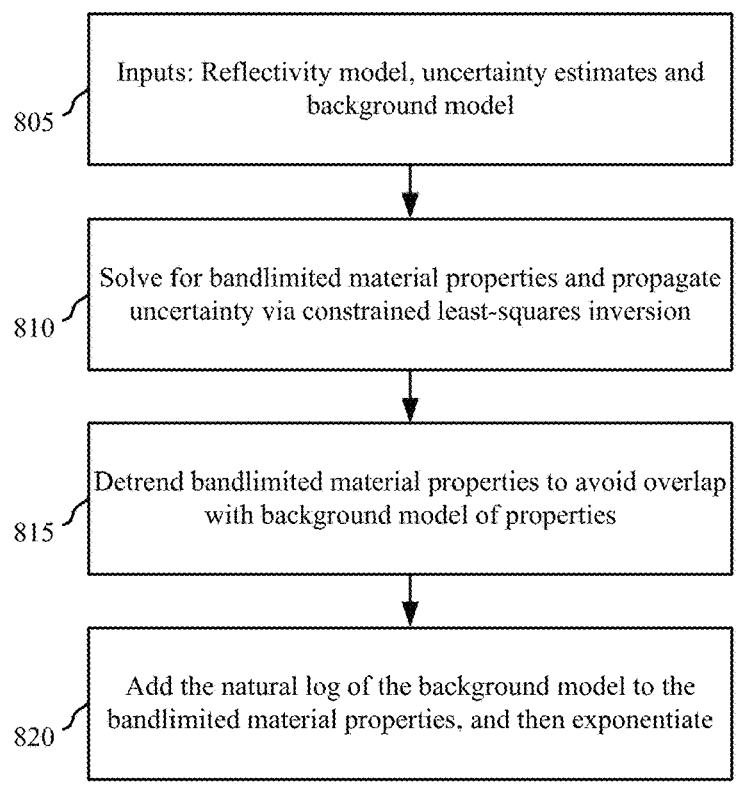
FIG. 8 illustrates a method for implementing the CSI algorithms disclosed herein, in accordance with aspects of the present disclosure.

FIG. 8 relates to this aspect of the disclosure. FIG. 8 illustrates a method 800. At step 805, the determined reflectivity model, uncertainty estimates and background model are used as inputs. At step 810, a solution for bandlimited material properties may be found. Uncertainty may be propagated via constrained least-squares inversion. Step 815 may include detrending bandlimited material properties to avoid overlap with background model of properties. Step 820 may include adding the natural log of the background model to the bandlimited material properties, and then exponentiating.

We may utilize linearized reflection models, which, depending on the type of reflectivity or the degree of the linear expansion, may have M bases. In the case of the classic Shuey's linearized reflectivity model (below) for P wave reflectivity, M=3.

$$R_{PP}^{iso}(\theta) = \frac{1}{2}\left(\frac{\Delta\rho}{\rho} + \frac{\Delta vp}{vp}\right) + \qquad (1)$$

$$\left(-2\frac{vs^2}{vp^2}\frac{\Delta\rho}{\rho} + \frac{1}{2}\frac{\Delta vp}{vp} - 4\frac{vs^2}{vp^2}\frac{\Delta vs}{vs}\right)\sin^2\theta + \left(\frac{1}{2}\frac{\Delta vp}{vp}\right)\sin^2\theta\tan^2\theta,$$

or simplified to:

$$R_{PP}^{iso}(\theta) = I + G \sin^2\theta + F \sin^2\theta \tan^2\theta \qquad (2)$$

where we can calculate the reflectivity R at a defined angle of incidence θ. To relate basis coefficients of this equation (e.g. I, G and F) to reflectivity, we can form a linear system of equations:

$$Gx = R, \qquad (3)$$

where $$G = \begin{vmatrix} 1 & \sin^2\theta_1 & \sin^2\theta_1 \tan^2\theta_1 \\ " & " & " \\ 1 & \sin^2\theta_N & \sin^2\theta_N \tan^2\theta_N \end{vmatrix},$$

$$x = \begin{vmatrix} I \\ G \\ F \end{vmatrix},$$

$$\text{and } R = \begin{vmatrix} R(\theta_0) \\ " \\ R(\theta_N) \end{vmatrix}$$

Note that G is size (N×M), and x is length (M) and R is length (N).

The algorithm may be refined as follows, with steps 1, 2, and 3 being repeated until convergence.

Step 1: We may first take a single angle or offset gather, composed of N number of 1-D traces of length NS(NS=total number of time samples (t)), and apply a Fourier transform to each of the N traces—independent of each other. In the Fourier domain there are now N number of frequencies (ω). For each trace (indexed by i) we may apply a deconvolution operation to remove the influence of the wavelet (W) from the observed seismic (S) and recover the reflectivity, given by:

$$f_i = R_i(\omega) + \mu W(\omega)^* (W(\omega)^* R_i(\omega) - S_i(\omega)), \text{ for } i=1,2,\ldots N\text{(Fourier Domain)} \qquad 1$$

The intermediate reflectivity estimate (f(ω)) may then be transformed back into the time domain via an inverse Fourier transform to get (f(t)).

Step 2. To efficiently perform thresholding, we may transform the matrix G (AVA basis) (see equation 3) into an orthogonal form using the Singular Value Decomposition (SVD). This step may be taken out of the 'loop' of the algorithm if the matrix G does not change with time (t), and calculated once ahead of time.

$$G = U\Sigma V^T, \sigma = \text{diag}(\Sigma) \text{(AVA basis to SVD basis)} 2 \text{(dimensions } M \times N\text{)}$$

This produces eigenvectors (U and V) and eigenvalues (σ)

Step 3. We may then project each of the M eigenvectors ($u_m$) (of length N) of the matrix U onto the intermediate reflectivities f of (length N) for a discrete time t by taking the inner product and normalizing by the eigenvalue ($\sigma_m$). This scalar value may then be evaluated to see if its magnitude is greater than or less than the threshold level (T). The thresholded value may then be transformed back into the original basis of G (AVA basis) by multiplication with vector ($v_m$). This may give the M coefficients of x (see equation 3).

$$x(t) = \sum_{m=1,}^{M} \frac{1}{\sigma_m^2} F(\sigma_m \langle f(t) | u_m \rangle) v_m \text{ repeated for } t = 1, 2, \ldots NS$$

$$F(y) = \begin{cases} y - T & \text{if } y > T \\ y + T & \text{if } y < T, \\ 0 & \text{if } |y| < T \end{cases}$$

$$\text{where } T = \frac{\lambda \mu}{2}$$

Note: Before transforming back using the vector $v_m$, we have M orthogonal coefficients, which we may refer to as eigen-coefficients herein. The number of non-zero eigen-coefficients may indicate the amount of independent information that we can recover.

Step 4. With the basis coefficients x(t) from step 3 we can calculate the reflectivities at each time t via the linear system of equations (3).

$$Gx = R \text{ repeated for } t=1,2, \ldots NS$$

This is the new reflectivity model of the gather for step 1.

The foregoing has outlined rather broadly various aspects of the present disclosure. The appended claims further highlight some aspects of the present disclosure, but it will be understood that they are not limiting thereof. The appended further highlight some aspects of the present disclosure.

Figure 9:
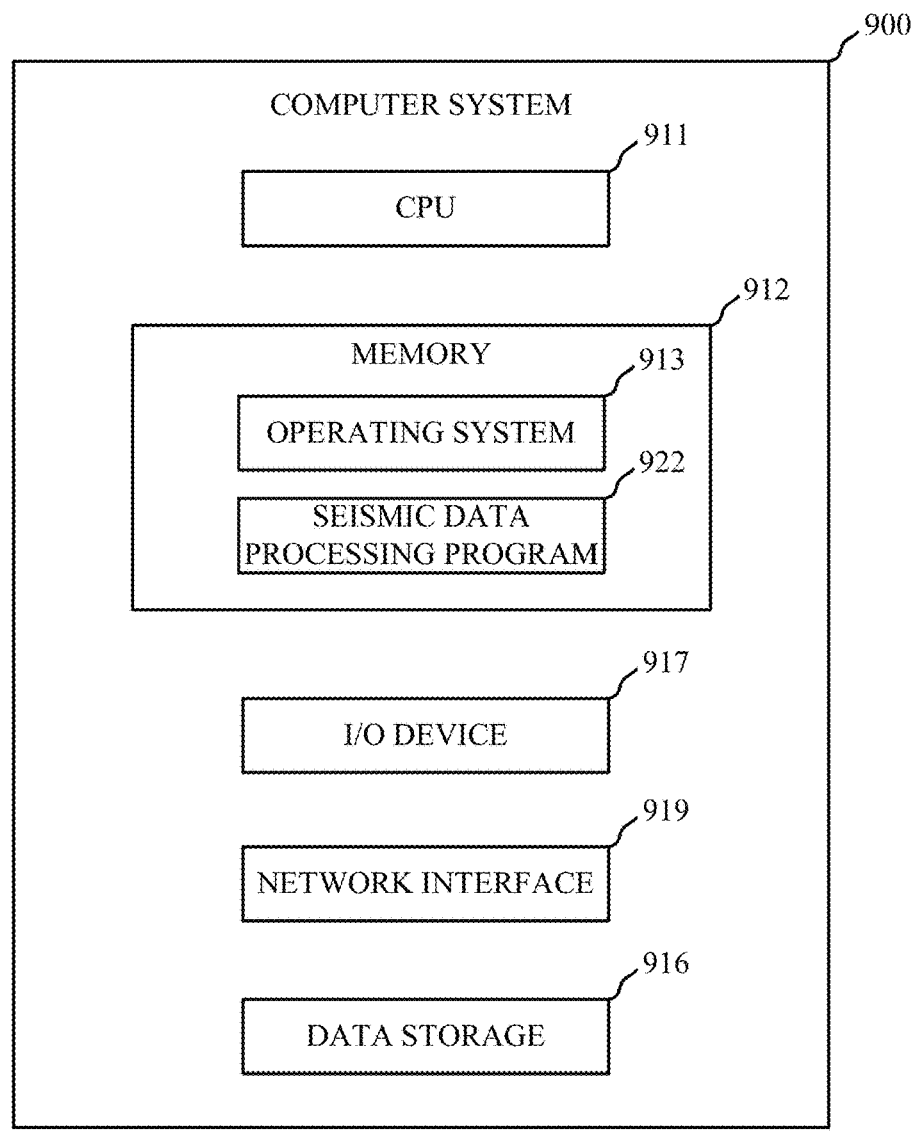
FIG. 9 is a diagram illustrating an example of a computer processing system that may be used in seismic data processing in accordance with aspects of the present disclosure.

Referring now to appended FIG. 9, an exemplary computer system 900 is illustrated, which may be used to perform one or more of the operations in the various methods described herein. As illustrated in FIG. 9, the computer system 900 may include at least one Central Processing Unit (CPU) 911, a memory 912, a data storage 916, an input/output device 917, and a network interface device 919. While a single CPU 911 is shown in FIG. 9, in alternative embodiments, a plurality of CPUs may be implemented within the computer system, or multiple computer systems may be combined as a processing cluster.

The input/output device 917 may include devices such as a mouse, keyboard, trackball, stylus pen, touchscreen, display (e.g., computer monitor), and the like. The network interface device 919 may be any entry/exit device configured to allow network communications between the computer system 900 and another device, e.g., another computer system, a server, and the like. In one embodiment, the network interface device 919 may be a network adapter or other network interface card (NIC).

Data storage 916 may be a Direct Access Storage Device (DASD). Although it is shown as a single unit, it could be a combination of fixed and/or removable storage devices, such as fixed disc drives, floppy disc drives, tape drives, removable memory cards, or optical storage. The memory 912 and data storage 916 could be part of one virtual address space spanning multiple primary and secondary storage devices.

The memory 912 may be a random access memory that is sufficiently large to hold the necessary programming and data structures of the present disclosure. While memory 912 is shown as a single entity, it should be understood that memory 912 may in fact comprise a plurality of modules, and that memory 912 may exist at multiple levels, from high speed registers and caches to lower speed but larger DRAM chips. The memory 912 may include an operating system 913. Any operating system supporting the functions disclosed herein may be used.

Memory 912 may also include a seismic data processing program 922 which, when executed by CPU 911, enables the processing of seismic data as described herein. Generally speaking, the memory 912 may include one or more programs configured process seismic data, which may be stored in the memory 912 and/or data storage 916, and the programs may be further configured to display or otherwise provide the seismic data and/or the results of said processing.

In methodologies directly or indirectly set forth herein, various steps and operations are described in one possible order of operation, but those skilled in the art will recognize that the steps and operations may be rearranged, replaced, or eliminated without necessarily departing from the spirit and scope of the disclosed embodiments. Further, all relative and directional references used herein are given by way of example to aid the reader's understanding of the particular embodiments described herein. They should not be read to be requirements or limitations, particularly as to the position, orientation, or use of the invention unless specifically set forth in the claims.

Furthermore, in various embodiments, the invention provides numerous advantages over the prior art. However, although embodiments of the invention may achieve advantages over other possible solutions and/or over the prior art, whether or not a particular advantage is achieved by a given embodiment is not limiting of the invention. Thus, the described aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computerized system. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a wireless network. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the computer into a machine-readable format and hence executable instructions. Also, programs are comprised of variables and data structures that either reside locally to the program or are found in memory or on storage devices.

What is claimed is:

1. A method of processing seismic data, comprising:
receiving a plurality of seismic traces [S(t)] in a common midpoint (CMP) gather representing reflected seismic energy in a portion of ground;
for each of the plurality of seismic traces [S(t)] in the CMP gather, generating a respective intermediate set of reflectivity coefficients [fi(t)] associated with each respective seismic trace [Si(t)] based at least in part on a respective previous set of reflectivity coefficients [Ri(t)] associated with the respective seismic trace [Si(t)] and a partial deconvolution of an estimated wavelet [W(t)] from the respective seismic trace [Si(t)];
decomposing a model [G] into a plurality of orthogonal components [U, Σ, V], the model [G] relating reflectivity to seismic properties [vp, vs, ρ] corresponding to a plurality of angles [θ] associated with the plurality of seismic traces [Si(t)];
projecting each of a plurality of eigenvectors [um] corresponding to one of the orthogonal components [U] of the model [G] onto intermediate reflectivity coefficients [fi] corresponding with all of the plurality of seismic traces at each of a plurality of times [t] to generate a plurality of eigen-coefficients associated with each of the plurality of times [t];
soft-thresholding the plurality of eigen-coefficients associated with each of the plurality of times [t];
summing the plurality of eigen-coefficients for each of the plurality of times [t];
generating a plurality of basis coefficients [x(t)] for each of the plurality of times [t] by multiplying the sum of the plurality of eigen-coefficients with a basis vector [vm] corresponding to a second of the orthogonal components [U] of the model [G]; and
generating a respective updated set of reflectivity coefficients for each of the plurality of seismic traces [S(t)] using the plurality of basis coefficients [x(t)] and the model [G]; and
generating, based on the respective updated set of reflectivity coefficients, a seismic image of the portion of ground.

2. The method of claim 1, further comprising:
normalizing the plurality of eigen-coefficients prior to said soft-thresholding by multiplication with an eigenvalue [σ] corresponding to the model [G].

3. The method of claim 1, further comprising:
iteratively repeating said generating the respective intermediate sets of reflectivity coefficients, said projecting, said soft-thresholding, said summing, said generating the pluralities of basis coefficients, and said generating the updated sets of reflectivity coefficients, wherein the updated sets of reflectivity coefficients from each iteration are used as the respective previous sets of reflectivity coefficients in each subsequent iteration.

4. The method of claim 1, wherein the estimated wavelet [W(ω)] is partially deconvolved from each respective seismic trace [Si(ω)] in a frequency domain to generate a frequency domain representation of the respective intermediate set of reflectivity coefficients [fi(ω)], and the respective intermediate set of reflectivity coefficients [fi(t)] is generated by transforming the frequency domain representation of the respective intermediate set of reflectivity coefficients [fi(ω)] into a time domain.

5. The method of claim 4, wherein the partial deconvolution acts to reduce influence of the estimated wavelet [W(t)] from the respective seismic trace [Si(t)].

6. The method of claim 1, further comprising:
for each of the plurality of seismic traces, generating a respective second intermediate set of reflectivity coefficients associated with each respective seismic trace based at least in part on a respective previous second set of reflectivity coefficients associated with the respective seismic trace and a partial deconvolution of the estimated wavelet from the respective seismic trace;
projecting each of the plurality of eigenvectors onto second intermediate reflectivity coefficients corresponding with all of the plurality of seismic traces at each of the plurality of times to generate a plurality of second eigen-coefficients associated with each of the plurality of times;
hard-thresholding the plurality of second eigen-coefficients associated with each of the plurality of times;
summing the plurality of second eigen-coefficients for each of the plurality of times;
generating a plurality of second basis coefficients for each of the plurality of times by multiplying the sum of the plurality of second eigen-coefficients with the basis vector; and
generating a respective second updated set of reflectivity coefficients for each of the plurality of seismic traces using the plurality of second basis coefficients and the model.

7. The method of claim 6, further comprising:
iteratively repeating said generating the respective second intermediate sets of reflectivity coefficients, said projecting, said soft-thresholding, said summing, said generating the pluralities of second basis coefficients, and said generating the second updated sets of reflectivity coefficients, wherein the second updated sets of reflectivity coefficients from each iteration are used as the previous second set of reflectivity coefficients in each subsequent iteration.

8. The method of claim 6, wherein the respective updated sets of reflectivity coefficients are used as the respective previous second sets of reflectivity coefficients.

9. The method of claim 6, wherein said hard-thresholding acts to remove bias in the model.

10. The method of claim 1, further comprising:
building a prior model based at least in part on the plurality of eigen-coefficients for each of the plurality of times, uncertainties associated with the updated sets of reflectivity coefficients, and prior statistical knowledge;
for each of the plurality of seismic traces, generating a respective Bayesian intermediate set of reflectivity coefficients based at least in part on the respective updated set of reflectivity coefficients associated with each respective seismic trace and a partial deconvolution of the estimated wavelet from the respective seismic trace; and
updating the prior model using a Bayesian least squares technique constrained by the uncertainties associated with the updated sets of reflectivity coefficients and the Bayesian intermediate sets of reflectivity coefficients.

11. The method of claim 10, wherein said building of the prior model is an automated process.

12. The method of claim 1, further comprising:
determining layer properties of a subsurface region corresponding to the CMP gather based at least in part on the plurality of basis coefficients for each of the plurality of times and the updated sets of reflectivity coefficients for each of the plurality of seismic traces.

13. The method of claim 12, further comprising:
constraining the determination of the layer properties using a Bayesian least-squares technique considering uncertainties associated with the updated sets of reflectivity coefficients and prior statistical knowledge of the subsurface region.

14. The method of claim 12, wherein the layer properties include one or both of P-impedance or S-impedance.

15. The method of claim 12, further comprising detrending the layer properties based at least in part on a background model.

* * * * *